(12) United States Patent
Wendel et al.

(10) Patent No.: US 12,493,288 B2
(45) Date of Patent: Dec. 9, 2025

(54) SYSTEMS AND METHODS OF CONTROLLING A VEHICLE INCORPORATING REMOTE, IN-VEHICLE, AND AUTONOMOUSLY GENERATED DATA

(71) Applicant: Kodiak Robotics, Inc., Mountain View, CA (US)

(72) Inventors: Andreas Wendel, Mountain View, CA (US); Felix Duvallet, Sunnyvale, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 106 days.

(21) Appl. No.: 18/364,835

(22) Filed: Aug. 3, 2023

(65) Prior Publication Data

US 2025/0044788 A1    Feb. 6, 2025

(51) Int. Cl.
*B60W 10/00* (2006.01)
*B60W 60/00* (2020.01)
*G05D 1/00* (2006.01)

(52) U.S. Cl.
CPC ......... *G05D 1/0016* (2013.01); *B60W 60/001* (2020.02); *B60W 2420/403* (2013.01); *B60W 2420/408* (2024.01); *B60W 2710/1005* (2013.01); *B60W 2710/18* (2013.01); *B60W 2710/20* (2013.01); *B60W 2720/106* (2013.01)

(58) Field of Classification Search
CPC .............. G05D 1/0016; B60W 60/001; B60W 2420/403; B60W 2420/408; B60W 2710/1005; B60W 2710/18; B60W 2710/20; B60W 2720/106; B60W 10/00

USPC ............................................................ 701/2
See application file for complete search history.

(56) References Cited

U.S. PATENT DOCUMENTS

| | | | |
|---|---|---|---|
| 5,612,883 A | 3/1997 | Shaffer et al. | |
| 10,328,897 B1* | 6/2019 | Nabbe ................... | B60W 30/10 |
| 10,509,410 B2 | 12/2019 | Hammond et al. | |
| 11,079,753 B1 | 8/2021 | Roy | |
| 2006/0089800 A1 | 4/2006 | Svendsen et al. | |
| 2008/0027591 A1 | 1/2008 | Lenser et al. | |

(Continued)

OTHER PUBLICATIONS

International Search Report and Written Opinion issued on Nov. 18, 2024 for International Patent Application No. PCT/US24/40750 (29 pages).

*Primary Examiner* — Shardul D Patel
(74) *Attorney, Agent, or Firm* — Fox Rothschild LLP

(57) ABSTRACT

Systems and methods for controlling a vehicle are provided. The system may comprise a vehicle, one or more sensors, one or more actuation controls configured to enable the vehicle to perform one or more driving actions, and a controller, comprising a processor, configured to receive one or more trajectory commands, automatically generate an automatic trajectory command, and generate one or more driving actions. The one or more driving actions may correlate to one or more actuator commands configured to cause the vehicle to be positioned in accordance with the one or more trajectory plot points of the automatic trajectory command. The system may comprise a remote station system comprising one or more remote actuation controls configured generate the one or more driving actions of the remote trajectory command. The remote station system may be configured to generate one or more driving actions.

20 Claims, 16 Drawing Sheets

(56) References Cited

U.S. PATENT DOCUMENTS

| | | |
|---|---|---|
| 2015/0248131 A1 | 9/2015 | Fairfield et al. |
| 2016/0139594 A1* | 5/2016 | Okumura ............. B60W 30/00 701/2 |
| 2017/0090480 A1 | 3/2017 | Ho et al. |
| 2018/0154899 A1 | 6/2018 | Tiwari et al. |
| 2018/0356814 A1 | 12/2018 | Brooks |
| 2018/0364704 A1 | 12/2018 | Liu et al. |
| 2019/0049948 A1* | 2/2019 | Patel ................... G05D 1/0027 |
| 2019/0138000 A1 | 5/2019 | Hammond et al. |
| 2019/0161080 A1 | 5/2019 | Gochev et al. |
| 2019/0220002 A1 | 7/2019 | Huang et al. |
| 2019/0278298 A1 | 9/2019 | Pedersen et al. |
| 2020/0047773 A1 | 2/2020 | Akaba et al. |
| 2020/0057436 A1 | 2/2020 | Boda et al. |
| 2020/0333778 A1 | 10/2020 | Lambert |
| 2020/0379457 A1 | 12/2020 | Ostafew et al. |
| 2021/0018908 A1 | 1/2021 | Tokuda et al. |
| 2021/0024099 A1* | 1/2021 | Ito ....................... G05D 1/0022 |
| 2021/0088784 A1 | 3/2021 | Whitmire et al. |
| 2021/0116907 A1 | 4/2021 | Altman |
| 2021/0163021 A1 | 6/2021 | Frazzoli et al. |
| 2021/0179122 A1 | 6/2021 | Zhu |
| 2021/0191403 A1 | 6/2021 | Rastoll et al. |
| 2021/0245747 A1 | 8/2021 | Naithani et al. |
| 2021/0341917 A1 | 11/2021 | Feng et al. |
| 2022/0044430 A1 | 2/2022 | Eckman et al. |
| 2022/0128989 A1 | 4/2022 | Ghorbanian-Matloob et al. |
| 2022/0171382 A1 | 6/2022 | Austria et al. |
| 2022/0194419 A1 | 6/2022 | Houshmand et al. |
| 2023/0184950 A1* | 6/2023 | Greenberg ............. G01S 17/42 356/4.01 |
| 2023/0192129 A1 | 6/2023 | Winter et al. |
| 2023/0322270 A1 | 10/2023 | Cui |
| 2023/0359198 A1 | 11/2023 | Zhang |
| 2024/0310841 A1 | 9/2024 | Samuels et al. |
| 2025/0002049 A1 | 1/2025 | Tam et al. |
| 2025/0029277 A1 | 1/2025 | Foucard |

\* cited by examiner

SYSTEMS AND METHODS OF CONTROLLING A VEHICLE INCORPORATING REMOTE, IN-VEHICLE, AND AUTONOMOUSLY GENERATED DATA

BACKGROUND

Field of the Disclosure

Embodiments of the present disclosure relate to vehicle control and, in particular, to systems and methods for vehicle control using autonomous and remote operation.

Description of the Related Art

To safely and efficiently navigate an environment and prevent possible collision, self-driving or otherwise autonomous vehicles (AVs) require the ability to detect one or more objects, obstacles, and/or road surface conditions within an environment of the AV. To detect these objects and potential hazards, AVs are often equipped with one or more types of environmental sensing technologies, such as, e.g., photographic imaging systems and technologies (e.g., cameras), radio detection and ranging (RADAR) systems and technologies, and Light Detection and Ranging (LiDAR) systems and technologies, among other suitable environmental sensing technologies.

A LiDAR sensor is configured to emit light, which strikes material (e.g., objects) within the vicinity of the LiDAR sensor. Once the light contacts the material, the light is deflected. Some of the deflected light bounces back to the LiDAR sensor. The LiDAR sensor is configured to measure data pertaining to the light bounced back (e.g., the distance traveled by the light, the length of time it took for the light to travel from and to the LiDAR sensors, the intensity of the light returning to the LiDAR sensor, etc.). This data can then be used to generate a point cloud reflecting some or all of the environment around the LiDAR sensor, generally recreating an object map of the objects within the environment.

When used on a vehicle, the LiDAR sensor can be used to detect one or more objects within the environment of the vehicle. General use of LiDAR in AVs is beneficial in detecting the presence and/or absence of objects and/or obstacles within the environment of the AVs, to ensure that the A Vs do not collide with the objects and/or obstacles. Sensor data, including camera data, may also be used in the detection of roads, lanes within the roads, traffic signs, and traffic signals, among others. This object and obstacle detection may be used to automatically generate trajectories for determining one or more actions to be performed by the AV.

While purely autonomous vehicle trajectory generation may be used in the control of vehicles, this type of vehicle control does not incorporate the benefits that are inherent in user-controlled vehicle operation such as, e.g., manual and/or remote control. Additionally, purely manual and/or remote vehicle control does not incorporate the benefits of autonomous vehicle control. In many instances, it may be beneficial to combine the benefits of autonomous vehicle control with remote vehicle control.

Therefore, for at least these reasons, systems and methods for controlling vehicles using autonomous and remote operation are needed.

SUMMARY

According to an object of the present disclosure, a system for controlling a vehicle is provided. The system may comprise a vehicle and one or more sensors, coupled to the vehicle, configured to generate one or more data points pertaining to one or more of an environment of the vehicle and one or more system component measurements of the vehicle. The system may comprise one or more actuation controls configured to enable the vehicle to perform one or more driving actions and a controller, comprising a processor, configured to receive one or more trajectory commands. Each of the one or more trajectory commands may comprise trajectory instructions which comprise one or more trajectory plot points. Each trajectory plot point, of the one or more trajectory plot points, may comprise position coordinates for the vehicle to be at a designated time. The one or more trajectory commands may comprise a manual trajectory command, a remote trajectory command, and an automatic trajectory command. The controller may be configured to automatically generate the automatic trajectory command based on the one or more data points generated from the one or more sensors and generate, based on the one or more trajectory plot points of the automatic trajectory command, one or more driving actions. The one or more driving actions may correlate to one or more actuator commands configured to cause the vehicle to be positioned in accordance with the one or more trajectory plot points of the automatic trajectory command. The system may comprise a remote station system comprising one or more remote actuation controls configured generate the one or more driving actions of the remote trajectory command. The remote station system may be configured to receive the one or more data points generated by the one or more sensors, generate the remote trajectory command when adjustment of the one or more remote actuation controls is manually applied, and generate, based on the one or more trajectory plot points of the remote trajectory command, one or more driving actions. The one or more driving actions correlate to one or more actuator commands configured to cause the vehicle to be positioned in accordance with the one or more trajectory plot points of the remote trajectory command. The remote station system may be configured to transmit the remote trajectory command to the vehicle. The one or more actuation controls may be configured to generate the manual trajectory command when adjustment of the one or more actuation controls is manually applied and generate, based on the one or more trajectory plot points of the manual trajectory command, one or more driving actions. The one or more driving actions may correlate to one or more actuator commands configured to cause the vehicle to be positioned in accordance with the one or more trajectory plot points of the manual trajectory command. The controller may be configured to determine whether the manual trajectory command is present and, when the manual trajectory command is present, cause the vehicle, via the one or more actuation controls, to perform the one or more driving actions in accordance with the manual trajectory command.

According to various embodiments, the system may comprise a switch configured to switch command of the vehicle between automatic trajectory control and remote station system control when the manual trajectory command is not present. When command of the vehicle is switched to automatic trajectory control, the controller may be configured to cause the vehicle, via the one or more actuation controls, to perform the one or more driving actions in accordance with the automatic trajectory command. When command of the vehicle is switched to remote trajectory control, the controller may be configured to cause the vehicle, via the one or more actuation controls, to perform the one or more driving actions in accordance with the remote trajectory command.

According to various embodiments, the system may comprise a processor configured to cause the switch to switch control of the vehicle between the automatic trajectory control and the remote station system control.

According to various embodiments, the one or more trajectory plot points may comprise trajectory plot points generated in 0.1 second intervals.

According to various embodiments, the trajectory instructions may comprise trajectory plot points generated over a 15 second period of time.

According to various embodiments, the one or more sensors may comprise a Light Detection and Ranging (LiDAR) sensor and a camera.

According to various embodiments, the one or more data points may comprise a LiDAR point cloud generated by the LiDAR sensor and an image captured by the camera.

According to various embodiments, the one or more actuation controls may comprise one or more of: a brake pedal; an acceleration pedal; a gear shift control; and a steering wheel.

According to an object of the present disclosure, a system for controlling a vehicle is provided. The system may comprise a vehicle and one or more sensors, coupled to the vehicle, configured to generate one or more data points pertaining to one or more of an environment of the vehicle and one or more system component measurements of the vehicle. The system may comprise one or more actuation controls configured to enable the vehicle to perform one or more driving actions and a computing device, comprising a processor and a memory, coupled to the vehicle, configured to store programming instructions that, when executed by the processor, are configured to cause the processor to receive one or more trajectory commands. Each of the one or more trajectory commands may comprise trajectory instructions which comprise one or more trajectory plot points. Each trajectory plot point, of the one or more trajectory plot points, may comprise position coordinates for the vehicle to be at a designated time. The one or more trajectory commands may comprise a manual trajectory command, a remote trajectory command, and an automatic trajectory command. The programming instructions, when executed by the processor, may be configured to cause the processor to automatically generate the automatic trajectory command based on the one or more data points generated from the one or more sensors and generate, based on the one or more trajectory plot points of the automatic trajectory command, one or more driving actions. The one or more driving actions may correlate to one or more actuator commands configured to cause the vehicle to be positioned in accordance with the one or more trajectory plot points of the automatic trajectory command. The system may comprise a remote station system comprising one or more remote actuation controls configured generate the one or more driving actions of the remote trajectory command. The remote station system may be configured to receive the one or more data points generated by the one or more sensors, generate the remote trajectory command when adjustment of the one or more remote actuation controls is manually applied, and generate, based on the one or more trajectory plot points of the remote trajectory command, one or more driving actions. The one or more driving actions may correlate to one or more actuator commands configured to cause the vehicle to be positioned in accordance with the one or more trajectory plot points. The remote station system may be configured to transmit the remote trajectory command to the vehicle. The one or more actuation controls may be configured to generate the manual trajectory command when adjustment of the one or more actuation controls is manually applied and generate, based on the one or more trajectory plot points of the manual trajectory command, one or more driving actions. The one or more driving actions may correlate to one or more actuator commands configured to cause the vehicle to be positioned in accordance with the one or more trajectory plot points of the manual trajectory command. The programming instructions, when executed by the processor, may be configured to cause the processor to determine whether the manual trajectory command is present and, when the manual trajectory command is present, cause the vehicle, via the one or more actuation controls, to perform the one or more driving actions in accordance with the manual trajectory command.

According to various embodiments, the system may further comprise a switch configured to switch command of the vehicle between automatic trajectory control and remote station system control when the manual trajectory command is not present. The programming instructions, when executed by the processor, may be configured to cause the processor to cause the vehicle, via the one or more actuation controls, to perform the one or more driving actions in accordance with the automatic trajectory command when command of the vehicle is switched to automatic trajectory control, and cause the vehicle, via the one or more actuation controls, to perform the one or more driving actions in accordance with the remote trajectory command when command of the vehicle is switched to remote trajectory control.

According to various embodiments, the programming instructions, when executed by the processor, may be configured to cause the processor to cause the switch to switch control of the vehicle between the automatic trajectory control and the remote station system control.

According to various embodiments, the one or more trajectory plot points may comprise trajectory plot points generated in 0.1 second intervals.

According to various embodiments, the trajectory instructions may comprise trajectory plot points generated over a 15 second period of time.

According to various embodiments, the one or more sensors may comprise a Light Detection and Ranging (LiDAR) sensor and a camera.

According to various embodiments, the one or more data points may comprise a LiDAR point cloud generated by the LiDAR sensor and an image captured by the camera.

According to various embodiments, the one or more actuation controls may comprise one or more of: a brake pedal; an acceleration pedal; a gear shift control; and a steering wheel.

According to an object of the present disclosure, a method for controlling a vehicle is provided. The method may comprise generating one or more data points from one or more sensors coupled to a vehicle. The one or more data points may pertain to one or more of an environment of the vehicle and one or more system component measurements of the vehicle. The method may comprise, via a controller, which comprises a processor, receiving one or more trajectory commands. Each of the one or more trajectory commands may comprise trajectory instructions which comprise one or more trajectory plot points. Each trajectory plot point, of the one or more trajectory plot points, may comprise position coordinates for the vehicle to be at a designated time. The one or more trajectory commands may comprise a manual trajectory command, a remote trajectory command, and an automatic trajectory command. The method may comprise, via the controller, automatically generating the automatic trajectory command based on the one or more data points generated from the one or more sensors and generating, based on the one or more trajectory plot points of the automatic trajectory command, one or more driving actions. The one or more driving actions may correlate to one or more actuator commands configured to cause the vehicle to be positioned in accordance with the one or more trajectory plot points of the automatic trajectory command. The method may comprise, via a remote station system comprising one or more remote actuation controls configured generate the one or more driving actions of the remote trajectory command, receiving the one or more data points generated by the one or more sensors, generating the remote trajectory command when adjustment of the one or more remote actuation controls is manually applied, and generating, based on the one or more trajectory plot points of the remote trajectory command, one or more driving actions. The one or more driving actions may correlate to one or more actuator commands configured to cause the vehicle to be positioned in accordance with the one or more trajectory plot points of the remote trajectory command. The method may comprise, via the remote station system, transmitting the remote trajectory command to the vehicle. The method may comprise, via the one or more actuation controls, generating the manual trajectory command when adjustment of the one or more actuation controls is manually applied, and generating, based on the one or more trajectory plot points of the manual trajectory command, one or more driving actions. The one or more driving actions may correlate to one or more actuator commands configured to cause the vehicle to be positioned in accordance with the one or more trajectory plot points of the manual trajectory command. The method may comprise, via the controller, determining whether the manual trajectory command is present and, when the manual trajectory command is present, causing the vehicle, via the one or more actuation controls, to perform the one or more driving actions in accordance with the manual trajectory command.

According to various embodiments, the method may further comprise, via a switch, switching command of the vehicle between automatic trajectory control and remote station system control when the manual trajectory command is not present. When command of the vehicle is switched to automatic trajectory control, the controller may be configured to cause the vehicle, via the one or more actuation controls, to perform the one or more driving actions in accordance with the automatic trajectory command. When command of the vehicle is switched to remote trajectory control, the controller may be configured to cause the vehicle, via the one or more actuation controls, to perform the one or more driving actions in accordance with the remote trajectory command.

According to various embodiments, the one or more trajectory plot points may comprise trajectory plot points generated in 0.1 second intervals.

According to various embodiments, the trajectory instructions may comprise trajectory plot points generated over a 15 second period of time.

According to various embodiments, the one or more sensors may comprise a Light Detection and Ranging (LiDAR) sensor and a camera.

According to various embodiments, the one or more data points may comprise a LiDAR point cloud generated by the LiDAR sensor and an image captured by the camera.

According to various embodiments, the one or more actuation controls may comprise one or more of: a brake pedal; an acceleration pedal; a gear shift control; and a steering wheel.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
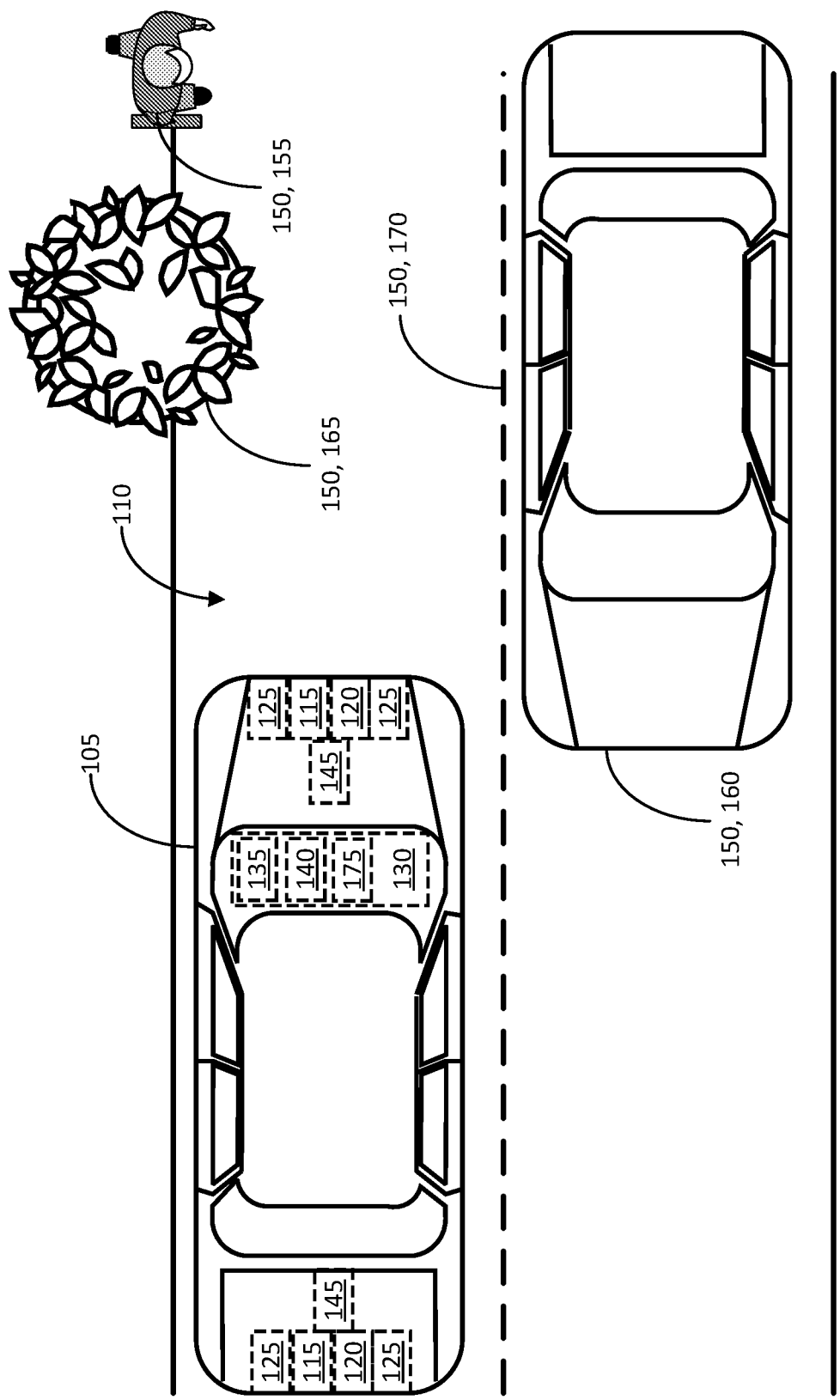
FIG. 1 shows an example vehicle configured to be controlled via autonomous and remote control, according to various embodiments of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator, either onboard or remotely), automobiles (e.g., cars, trucks, sports utility vehicles, vans, buses, commercial vehicles, class 8 trucks etc.), boats, drones, trains, and the like.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable programming instructions executed by a processor, controller, or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network-coupled computer systems so that the computer readable media may be stored and executed in a distributed fashion such as, e.g., by a telematics server or a Controller Area Network (CAN).

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, some embodiments of the present disclosure will be described in detail with reference to the drawings. In the drawings, the same reference numerals will be used throughout to designate the same or equivalent elements. In addition, a detailed description of well-known features or functions will be ruled out in order not to unnecessarily obscure the gist of the present disclosure.

Hereinafter, systems and methods for performing vehicle control using autonomous and remote operation, according to embodiments of the present disclosure, will be described with reference to the accompanying drawings.

Referring now to FIG. 1, an example vehicle 105 configured to be controlled via autonomous and remote control is provided, in accordance with various embodiments of the present disclosure. As shown in FIG. 1, the vehicle 105 is positioned on a roadway 110. It is noted, however, that the vehicle 105 may be positioned on any suitable surface while maintaining the spirit and functionality of the present disclosure.

According to various embodiments, the vehicle 105 may comprise one or more sensors such as, for example, one or more Light Detection and Ranging (LiDAR) sensors 115, one or more radio detection and ranging (radar) sensors 120, one or more cameras 125, and one or more ultrasonic transducers 145, among other suitable sensors. According to various embodiments, the one or more sensors may be in electronic communication with one or more computing devices 130. The computing devices 130 may be separate from the one or more sensors and/or may be incorporated into the one or more sensors. The vehicle 105 may comprise a LiDAR system which may comprise one or more LiDAR sensors 115 and/or one or more computing devices 130. The vehicle 105 may comprise a camera system which may comprise one or more cameras 125 and/or one or more computing devices 130.

In the example of FIG. 1, the LiDAR sensor 115 may be configured to emit light, which may strike a material (e.g., the roadway 110, one or more obstacles 150, rain, snow, etc.) within the environment of the vehicle 105.

According to various embodiments, the one or more obstacles 150 may comprise one or more objects, one or more geographic hindrances to travel, and/or one or more other suitable obstacles 150. According to various embodiments, the one or more obstacles 150 may comprise one or more pedestrians 155, one or more animals, one or more vehicles 160, one or more pieces of vegetation 165, one or more lane markers 170, one or more traffic signs, one or more traffic signals, and/or one or more other suitable obstacles 150.

Once the light emitted from the LiDAR sensor 115 comes into contact with the material, the light is deflected. Some of the deflected light bounces back to the LiDAR sensor 115. The LiDAR sensor 115 may be configured to measure data pertaining to the light bounced back (for example, the distance traveled by the light, the length of time it took for the light to travel from and to the LiDAR sensor 115, the intensity of the light returning to the LiDAR sensor 115, and so on as understood by a person of ordinary skill). This data may then be used to generate a point cloud (i.e., data points, in a coordinate system, which represent locations of obstacles within an environment) of some or all of the environment around the vehicle 105, generally recreating an object map of the road surface of the roadway 110, obstacles 150 within the environment, and so on.

According to various embodiments, the LiDAR sensor 115 may be coupled to the vehicle 105 and may be configured to generate one or more point clouds of an environment surrounding the vehicle 105. The environment may fully surround the vehicle or may encompass a portion of the vehicle's 105 surroundings. According to various embodiments, the LiDAR sensor 115 may be in electronic communication and/or coupled to the one or more cameras 125.

According to various embodiments, the computing device 130 may comprise a processor 135 and/or a memory 140. The memory 140 may be configured to store programming instructions that, when executed by the processor 135, are configured to cause the processor 135 to perform one or more tasks such as, e.g., receiving one or more data points from one or more sensors, receiving one or more LiDAR point clouds, detecting one or more obstacles within the one or more LiDAR point clouds, generating one or more patches for each obstacle, projecting one or more patches onto one or more camera images, performing one or more color queries on the one or more camera images, labeling one or more obstacle points, labelling one or more obstacles, determine and/or classifying whether each of the one or more obstacles can and/or cannot be hit by a vehicle, determining one or more vehicle actions, performing automatic trajectory control, performing remote station system control, switching vehicle control between automatic trajectory control, remote system control, and/or manual control, performing a fallback function in conjunction with remote station system control, automatic trajectory control, and/or manual control, determining whether an automatic trajectory command is present, determining whether a remote trajectory command is present, determining whether a manual trajectory command is present, and/or performing one or more vehicle actions, among other functions.

According to various embodiments, the computing device 130 may function as a controller for controlling one or more functions of the vehicle 105. According to various embodiments, the vehicle 105 may comprise a switch 175 configured to switch vehicle control between automatic trajectory control, remote system control, and/or manual control. The switch 175 may be a component of the computing device 130 and/or may be separate and apart from the computing device 130. The switch 175 may be in electronic communication with the computing device 130.

Figure 2:
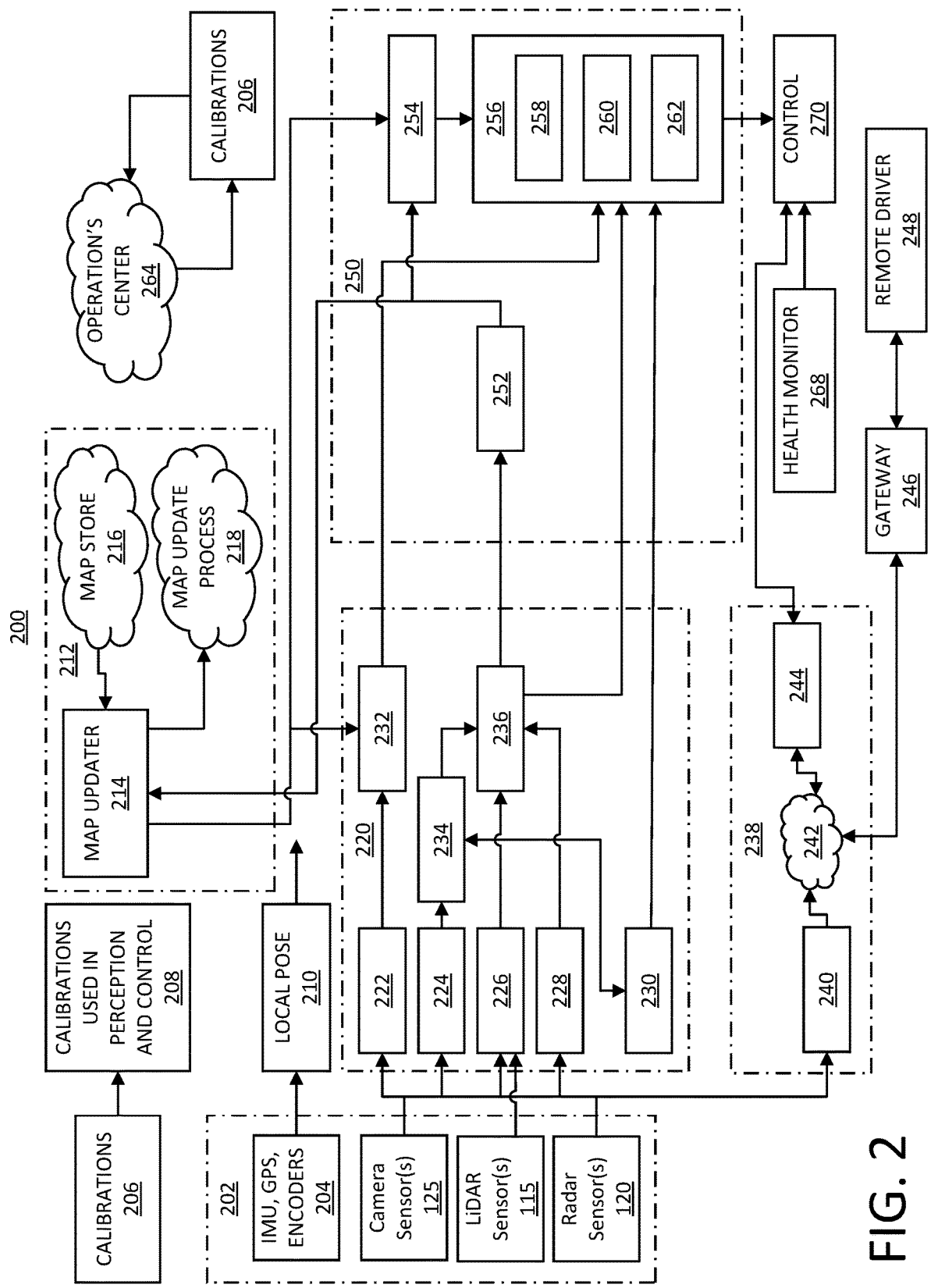
FIG. 2 is an example block diagram of an autonomous driving system of a vehicle, according to various embodiments of the present disclosure.

The vehicle 105 may comprise an autonomous driving system 200, such as shown, for example, in FIG. 2.

According to various embodiments, the autonomous driving system 200 for a vehicle (e.g., vehicle 105 as shown in FIG. 1) may comprise a sensor module 202, a perception module 220, a planning module 250, a control module 270, a mapping module 212, and/or a remote driving module 238. According to various embodiments, the control module 270 may comprise and/or be similar to systems (e.g., actuator control engine (ACE) systems) shown and described in U.S. patent application Ser. Nos. 18/228,044 and 18/228,101, the contents of which are herein incorporated by reference in their entirety. It is noted, however, that other suitable control modules 270 may be incorporated, while maintaining the spirit and functionality of the present disclosure.

The sensor module 202 may comprise a plurality of sensor types for sensing the environment around the vehicle. The plurality of sensor types may comprise, e.g., one or more LiDAR sensors 115, one or more radar sensors 120, and/or one or more camera sensors 125, and/or other suitable sensors. The sensor module 202 may be configured to transmit the data from the sensors to the perception module 220.

The perception module 220 may be configured to ingest the sensor data from the plurality of sensors to detect the environmental conditions (e.g., obstacle detection, object detection, etc.) around the vehicle. The environmental conditions may comprise the presence of nearby vehicles 160, the driving surface 110, flora 165 and fauna 155, and/or other objects that may be on or near the road surface. According to various embodiments, the environmental conditions may comprise the presence and/or identification of one or more lane markers 170, one or more traffic signs, one or more traffic signals, and/or other suitable environmental conditions.

According to various embodiments, the planning module 250 may be configured to receive one or more outputs of one or more detected objects and obstacles from the perception module 220 and map information from the mapping module 212 to create a driving plan for the vehicle. The driving plan from the planning module 250 may be passed to the control module 270 where the plan may be interpreted into one or more control signals/driving actions for the vehicle, which may comprise driving actions for controlling a throttle signal, a brake signal, a steering control signal, and/or other suitable signal. According to various embodiments, the remote driving module 238 may be attached through a gateway 240 to a remote driver 248. The remote driving module 238 may be attached to the remote driver 248 through, e.g., one or more gateways 240, 244 and/or via one or more remote and/or cloud servers 242. According to various embodiments, the remote driver module 238 may be configured to take/receive input from the sensor module 202 and one or more inputs from the controller 270 for remote operation of the vehicle from the remote driver 248.

According to various embodiments, inputs to the autonomous driving system 200 may comprise one or more commands 266 from an operations center 264 that may be made in response to remote monitoring of the vehicle, and/or from requests made from the operations center 264 related to higher level requests of the total environment (e.g., rerouting for different pickups or responding to traffic, maintenance and service requests). Vehicle information may be input into the planning module 250 in order to create the driving plan/vehicle trajectory. Certain processes, such as calibrations 206 (e.g., calibrations 208 used in perception and control), local pose 210 and health monitoring 268 may interact with many components in the autonomous driving system 200 as necessary to validate, monitor and inform performance of the vehicle.

The sensor module 202 may comprise one or more inertial measurement units (IMU) and GPS encoders 204, cameras 125, LiDAR sensors 115, and/or radar sensors 120. The IMUs and GPS encoders 204 may be configured to define the pose 210 (position and orientation of the vehicle) as well as the kinematic properties of the vehicle (e.g., speed, acceleration, etc.). These properties may be used within all modules of the vehicle to perform certain processes necessary for the autonomous driving system 200 to continue to perform the driving tasks. The sensors may be configured to capture environmental data from the surroundings of the vehicle. The number and position of the sensors coupled to and/or in electronic communication with the vehicle may vary based on vehicle type and shape, as well as expected driving conditions. For example, at higher speeds, the environment may be sensed at greater distances. The field of view for the sensors may be configured to enable sensing for the driving domain for which the vehicle plans to operate.

The perception module 220 may be configured to detect one or more elements in the environment of the vehicle by processing the images or data received from the sensor module 202. The detectors may comprise one or more 2-Dimensional (2D) object detectors 224, one or more 3-Dimensional (3D) object detectors 226, one or more sensor detectors 228 (for example, a radar detector), one or more obstacle detectors 230, and/or other suitable detectors. Outputs from the one or more detectors may be used in the perception module 220, either individually or in combination with other detector output and/or sensor output, to generate additional perception features of the environment. These features may comprise ground plane features such as, e.g., lane and road lane detectors 222, 2D to 3D models 234, and/or sensor fusion and tracking modules 236. Output from the sensors and detectors may also be used in a localizer 232 to determine a precise position of the vehicle relative to the map and the environment. For example, the localizer 232 may be configured to determine precisely which lane on the road the vehicle is in.

According to various embodiments, the object detectors may be configured to receive the sensor data in order to classify one or more objects in the environment as well as bound those objects to a certain position within the environment. The detectors may be configured to use machine learning methods to classify objects within the sensor data. The 2D detectors 224 may be configured to primarily use the data from the cameras 125 to identify one or more objects from the camera images. The 3D detectors 226 may be configured to use LiDAR and radar data in addition to the camera data to classify and locate one or more objects in 3D space around the vehicle. The sensor detectors 228 may be configured to use output from a specific sensor to classify and locate one or more objects in the environment. For each detector type, a number of detectors may exist. For example, the detectors may comprise individual detectors for vehicle classes, pedestrian classes, bridge classes, and/or other classes where the data sets are large enough to create specific classes. The detectors may also comprise specific detectors for a single sensor alone and/or a combination of sensors. For example, a detector may exist from a left side (e.g., a driver's side) forward facing camera 125 to detect one or more vehicles, and a detector may exist from a left side (e.g., passenger's side) rear facing detector to also detect one or more vehicles. As vehicles look different from the front and from behind, these detectors may be trained differently to determine what objects are vehicles. Similarly, a right side camera 125 may exist which may be configured to capture more off road features like pedestrians/animals 155. Thus, each detector type may comprise one or multiple different detectors trained to specific classes as well as trained to specific sensor inputs.

According to various embodiments, the one or more obstacle detectors 230 may be configured to identify one or more perceived obstacles in the environment. According to various embodiments, the one or more obstacle detectors 230 may not be configured to classify the one or more obstacles as specific objects. The obstacle detector 230, then, may be configured to capture one or more uncommon obstacles (e.g., debris) that may be on the driving surface (e.g., road 110). For example, for a certain object the object detectors may be unable to classify the certain object without enough previous experience with the object in the training sets, and may not be able to identify the objects on the road, and the obstacle detector 230 may be configured to capture all of the unidentified returns as obstacles, which may then be passed into the planning module 250 as obstacles.

According to various embodiments, The sensor fusion and tracking module 236 may be configured to take all of the object detector outputs to create a single perceived environment around the vehicle. Many of the detectors may detect the same objects in the environment. The sensor fusion and tracking module 236 may be configured to combine these detections to create a single track for an object. That track may also persist with subsequent detections as time passes and the vehicle and objects around the vehicle move through the environment.

The planning module 250 may be configured to use the perception output and map information from the mapping module 212 to plan the path for the vehicle through the environment. The planning module 250 may comprise a construction zone handler 252, a routing handler 254, and a trajectory planner 256. The trajectory planner 256 may comprise a path option generator 258, a path decision module 260, and a path to trajectory module 262. The construction zone handler 252 may be configured to identify one or more changes to the road 110 because of new and/or completed construction on the roadway. The construction zone handler 252 may be configured to send one or more updates to the mapping module 212 to update (via, e.g., a map updater 214) the map information for future vehicles that may enter that part of the map. Information from the construction zone handler 252 may also be sent to the trajectory planner 256 so that the drivable zones of the roadway 110 may be identified relative to the construction zones. The routing handler 254 may comprise the information for all the routing instructions for the vehicle trip so that the trajectory planner may be informed of upcoming lane changes for road switches.

The trajectory planner 256 may be configured to receive the environmental information and road information from the perception module 220 and generate one or more possible paths through the environment toward the goal of following the routing information in the path option generator. The path decision module 260 may be configured to analyze the one or more paths that are generated in the path option generation module 258 to determine which path or paths are within the capabilities of the vehicle's performance, and then from those pick the path that fits the goals of the route and is safe within the vehicle's capabilities. The path to trajectory module 262 may be configured to then convert the path information to a trajectory model for a given period of time going forward. For example, the trajectory may be projected for the next 15 seconds, so that the trajectory sent to the control module 270 may receive coordinates for where the trajectory planner 256 wants the truck to be for the next 15 seconds.

According to various embodiments, the control module 270 may be configured to receive the trajectory information from the planning module 250 to generate control signals for the vehicle. The control signals may comprise a steering angle, a throttle control, and/or a brake control, among other suitable signals. The control module 270 may be configured to calculate the values of these signals based upon the physical coordinates and the times generated in the planning module 250. According to various embodiments, the control module 270 has maximum and minimum values for each of the signals and maintains the signals within those thresholds.

According to various embodiments, the mapping module 212 may be configured to hold the map for all roads the vehicles may proceed. As new roads are mapped, a map updater 214 may be configured to update the map in the map update process 218 and may be configured to store the map in the map store 216. According to various embodiments, the map update process 218 may be configured to update existing maps through data received from the current vehicle data such as, e.g., information from the construction zone handler 252. Thus, the map updater 214 may be configured to update existing maps and/or add additional maps to the map store 216.

According to various embodiments, the remote driving module 238 may be connected through a gateway 246 to the vehicle. The gateway 246 may comprise the software necessary to interpret the data streams that are being passed to and/or from the remote driving module 238 and the vehicle 105. The gateway 246 also may be configured to connect the operations center 264 to the remote driving module 238. The operations center 264 may be configured to pass information to the remote driving module 238 for display on the remote driving module 238, and/or may be configured to communicate via microphone and/or speakers. Similar to the planning module 220, the remote driving module 238 may be configured to pass a trajectory command to the control module 270 which may give specific locations and times along the trajectory for the vehicle to proceed to during the next time interval. The controller 270 may be configured to then processes the information the same as if the trajectory was sent from the planning module 220.

According to various embodiments, when a remote operator takes control of the vehicle from the autonomous driving system 200, a switch in the control module 270 may be configured to switch the input from an autonomous mode to the remote driving module 238 so that the control module 270 may respond to the signal from the remote driving module 238.

According to various embodiments, the vehicle may also be driven by a driver in the vehicle. Thus, the switch in the control module 270 may be configured to pass control signals from the planning module 250 and/or the remote driving module 238, and/or may not pass any signal so that the mechanical controls within the vehicle are passing the control signals to the actuation components in the vehicle. According to various embodiments, the control module 270 may be configured to mix the control signals (e.g., the trajectory commands) to account for perceptions from the autonomous vehicle stack and input form the remote driver 248 by, e.g., combining the trajectories of the two signals and choosing an optimal path from both driving systems.

According to various embodiments, the operations center 264 may be configured to pass information about the vehicle and load to the remote driving module 238. According to various embodiments, the operations center 264 may be configured to pass the information to the vehicle 105 for use in the software within the vehicle. This information may comprise instructions for the mapping module 212 for the route for the vehicle, and other information such as, e.g., vehicle weight and planned stops on the route.

Figure 3A:
FIGS. 3A-3B illustrate remote driving module displays, according to various embodiments of the present disclosure.
Figure 3B:
Figure 3C:
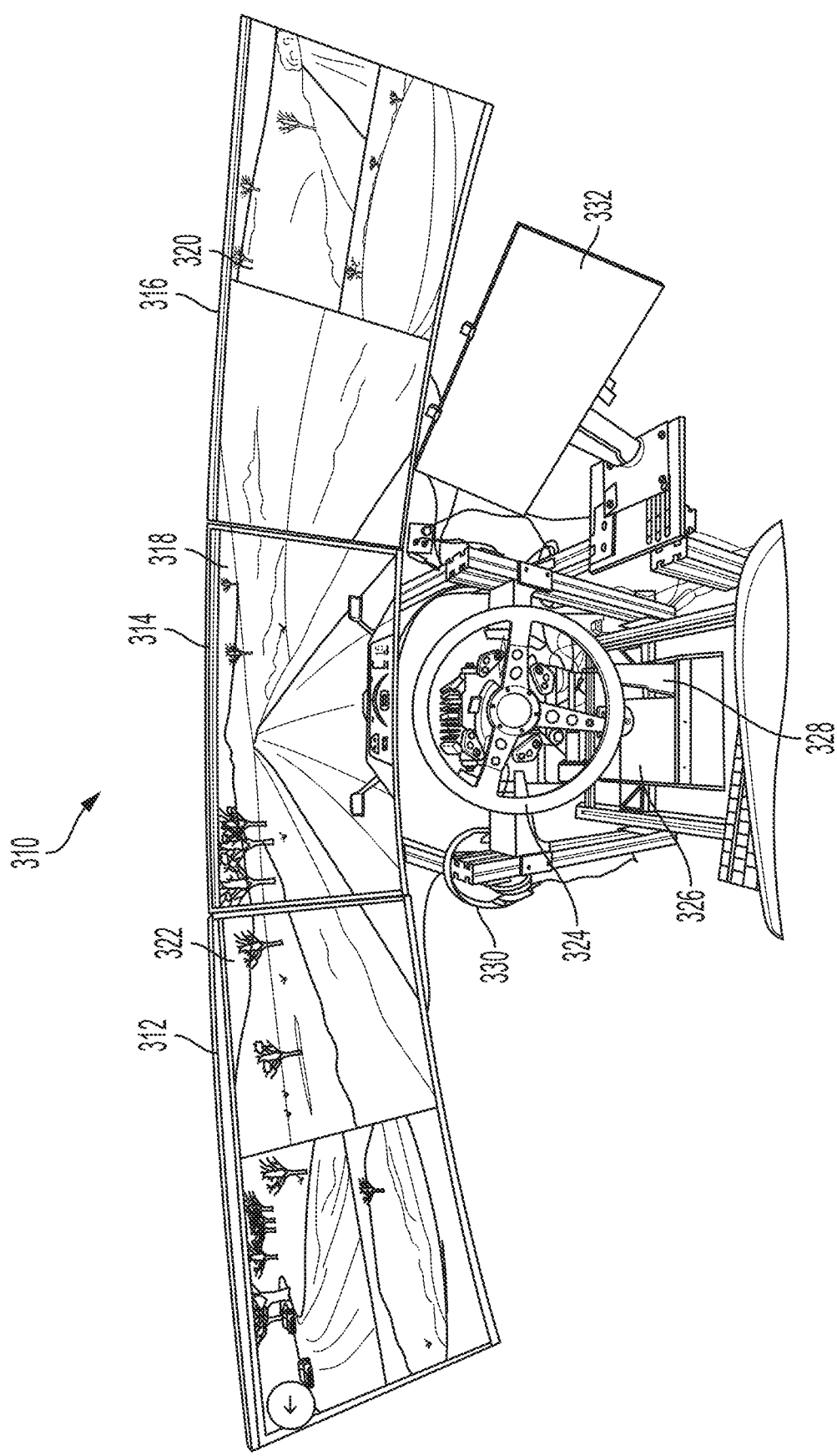
FIG. 3C illustrates a remote driving station, according to various embodiments of the present disclosure.

According to various embodiments, environmental data may be displayed on a display of remote driving module 238, as shown, e.g., in FIGS. 3A-3C.

Referring now to FIG. 3A, a remote driving module display 300 is illustratively depicted, in accordance with various embodiments of the present disclosure.

According to various embodiments, camera feeds may be passed from the one or more cameras 125 to the remote driving module 238. According to various embodiments, a runway 302 may be created from a steering position of the vehicle 105, throttle command of the remote driving module 238, and brake command of the remote driving module 238 to show the remote driver 248 the reaction of the vehicle 105 to the signals.

According to various embodiments, a secondary runway may also be passed from the planning module 250 in the vehicle 105 to the remote driving module 238 and overlaid on the camera view of the display 300. According to various embodiments, the secondary runway may be configured to guide the remote driver 248 for the perceived path the planning module 250 has calculated as the driving runway. According to various embodiments, the remote driver generated runway may be configured to be shown as overlapping the runway generated from the remote driving station.

Referring now to FIG. 3B, a remote driving module display 305 is illustratively depicted, in accordance with various embodiments of the present disclosure.

According to various embodiments, detections from the perception module 220 may be passed to the display 305 of the remote driving module 238. According to various embodiments, the detections can comprise lane lines 170, vehicles 160, pedestrians 155, total driving area 307, vegetation, traffic signs, traffic signals, and/or other suitable detections.

According to various embodiments, the display 305 may be configured to display one or more camera feeds 309 from the one or more camera sensors 125.

Referring now to FIG. 3C, a remote driving station 310 is illustratively depicted, in accordance with various embodiments of the present disclosure.

According to various embodiments, the remote driving station 310 may comprise one or more displays 312, 314, 316. The one or more displays 312, 314, 316 may be configured to display one or more camera feeds from the one or more cameras 125. For example, the one or more displays 312, 314, 316 may be configured to display one or more forward views 318, one or more side views 320, and/or one or more rear views 322.

According to various embodiments, the remote driving station 310 may comprise one or more actuation controls configured generate the one or more driving actions of a remote trajectory command. The one or more actuation controls may comprise, e.g., a steering control 324, an acceleration control 326, a deceleration control 328, and/or other suitable actuation controls. According to various embodiments, the remote driving station 310 may comprise headphones 330 configured to reproduce sound from the vehicle so that a remote driver 248 may hear sounds from within and/or exterior to the vehicle 105.

According to various embodiments, the remote driving station 310 may comprise one or more additional displays 332 configured to display information about the software, communication connection, health status checks for the vehicle, route information, and/or other suitable information.

Figure 4:
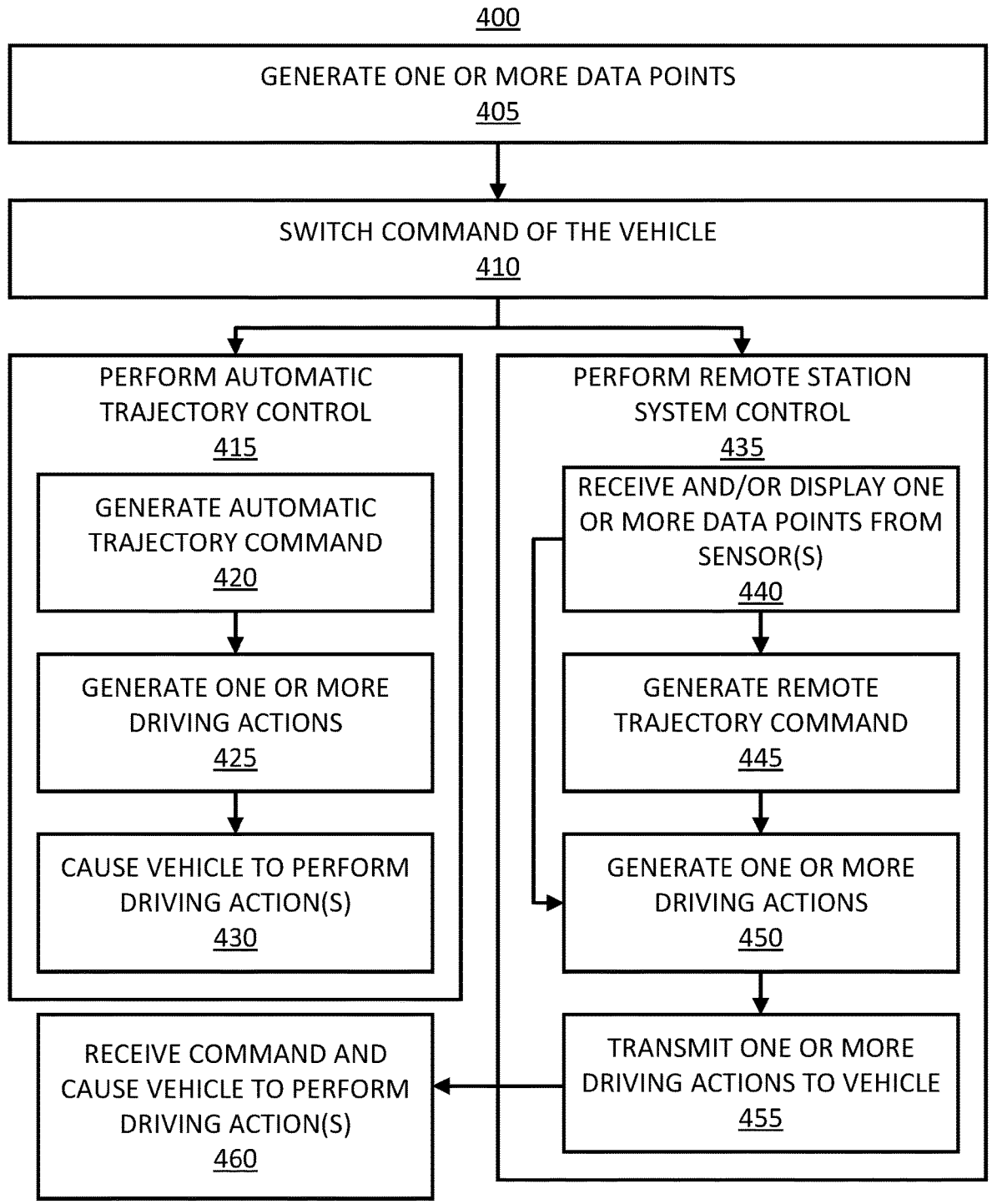
FIG. 4 is an example flowchart of a method for controlling a vehicle using autonomous and remote operation, according to various embodiments of the present disclosure.

Referring now to FIG. 4, an example flowchart of a method 400 for controlling a vehicle using autonomous and remote operation is described, in accordance with various embodiments of the present disclosure.

At 405, one or more data points may be generated from one or more sensors coupled to a vehicle. According to various embodiments, the one or more data points may pertain to one or more of an environment of the vehicle and one or more system component measurements of the vehicle.

At 410, using a switch, command of the vehicle may be switched between an automatic trajectory control and a remote station system control. According to various embodiments, the switch between automatic trajectory control and remote station system control may be automatic, manual, and/or a combination of automatic and manual. According to various embodiments, the switch may be optional, and vehicle control may be performed using automatic trajectory control, remote station system control, and/or manual control.

At 415, when command of the vehicle is switched to automatic trajectory control, the automatic trajectory control may be performed. According to various embodiments, the automatic trajectory control may be performed using a computing device, a processor, and/or other suitable components. According to various embodiments, performing the automatic trajectory control may comprise, at 420, automatically generating an automatic trajectory command based on the one or more data points generated from the one or more sensors. According to various embodiments, the automatic trajectory command may comprise automatic trajectory instructions which comprise one or more automatic trajectory plot points. Each automatic trajectory plot point, of the one or more automatic trajectory plot points, may comprise position coordinates for the vehicle to be at a designated time.

According to various embodiments, performing the automatic trajectory control may comprise, at 425, generating, based on the one or more automatic trajectory plot points, one or more driving actions. The one or more driving actions may correlate to one or more actuator commands configured to cause the vehicle to be positioned in accordance with the one or more automatic trajectory plot points over a set timeframe. According to various embodiments, the set timeframe may be 15 seconds. It is noted, however, that other suitable set timeframes may be incorporated (e.g., 5 seconds, 10 seconds, etc.) while maintaining the spirit and functionality of the present disclosure. According to various embodiments, the one or more trajectory plot points may comprise trajectory plot points generated in 0.1 second intervals. It is noted, however, that other suitable time intervals may be incorporated, while maintaining the spirit and functionality of the present disclosure.

According to various embodiments, performing the automatic trajectory control may comprise, at 430, causing the vehicle, via one or more actuation controls, to perform the one or more driving actions in accordance with the automatic trajectory command.

At 435, when command of the vehicle is switched to remote station system control, the remote station system control may be performed via a remote station system. According to various embodiments, the remote station system control may be performed using a computing device, a processor, and/or other suitable components. According to various embodiments, remote station system control may be performed using a remote station system and/or using a module which may be located at the vehicle and/or remotely from the vehicle.

According to various embodiments, performing the remote station system control may comprise, via the remote station system, receiving, at 440, the one or more data points generated by the one or more sensors. According to various embodiments, receiving the one or more data points may comprise receiving label data from the vehicle. According to various embodiments, the label data may comprise one or more changes in a speed of the vehicle, an acceleration of the vehicle, a direction of the vehicle, and/or other suitable changes. According to various embodiments, the label data may be displayed, via a display, as one or more visual cues. The one or more visual cues may comprise one or more color indicators, blinking text, one or more flashes, and/or one or more other suitable visual cues.

According to various embodiments, performing the remote station system control may comprise, via the remote station system, generating, at 450, one or more driving actions. The one or more driving actions may correlate to one or more actuator commands configured to cause the vehicle to perform the one or more driving actions. According to various embodiments, a vehicle trajectory may be generated at the vehicle and/or remotely.

According to various embodiments, the one or more actuation controls may comprise a brake pedal, an acceleration pedal, a gear shift control, a steering wheel, and/or one or more other suitable actuation controls. According to various embodiments, the one or more driving actions may be generated using the one or more remote actuation controls. According to various embodiments, the remote station system may comprise one or more displays configured to display the one or more images of the environment of the vehicle, and the performing the remote station system control may comprise displaying the one or more images of the environment of the vehicle, using the one or more displays.

According to various embodiments, the performing the remote station system control may comprise generating, at 445, a remote trajectory command. The remote trajectory command may comprise trajectory instructions which comprise one or more remote trajectory plot points. According to various embodiments, each trajectory plot point, of the one or more remote trajectory plot points, may comprise position coordinates for the vehicle to be at a designated time.

According to various embodiments, the one or more driving actions may be based on the one or more remote trajectory plot points. The one or more driving actions may correlate to one or more actuator commands configured to cause the vehicle to be positioned in accordance with the one or more remote trajectory plot points over a set timeframe. According to various embodiments, the set timeframe may be 15 seconds. It is noted, however, that other suitable set timeframes may be incorporated (e.g., 5 seconds, 10 seconds, etc.) while maintaining the spirit and functionality of the present disclosure. According to various embodiments, the one or more trajectory plot points may comprise trajectory plot points generated in 0.1 second intervals. It is noted, however, that other suitable time intervals may be incorporated, while maintaining the spirit and functionality of the present disclosure. According to various embodiments, the remote station system may comprise one or more remote actuation controls configured generate the one or more driving actions of the remote trajectory command.

According to various embodiments, performing the remote station system control may comprise, via the remote station system, transmitting (via, e.g., a transmitter), at 455, the trajectory command and/or the one or more driving actions to the vehicle. According to various embodiments, the vehicle may comprise a control module configured to receive the transmitted remote trajectory command and/or one or more driving actions. The control module, at 460, may receive the remote trajectory command and/or one or more driving actions and cause the vehicle, via one or more actuation controls, to perform the one or more driving actions. According to various embodiments, the one or more driving actions may be in accordance with the remote trajectory command.

Figure 5:
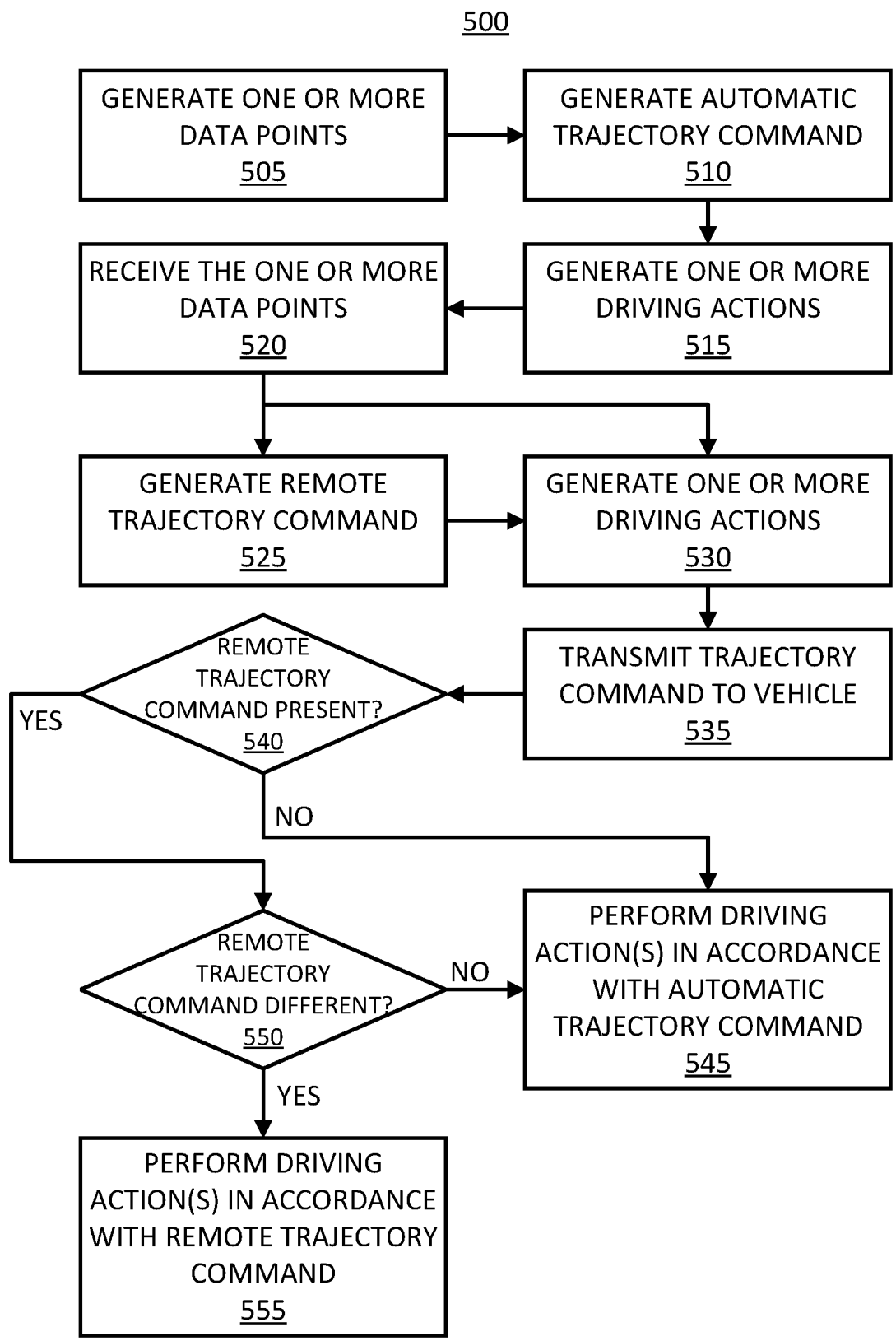
FIG. 5 is an example flowchart of a method for generating a trajectory of a vehicle by mixing autonomously generated and remotely generated vehicle trajectories, according to various embodiments of the present disclosure.

Referring now to FIG. 5, an example flowchart of a method 500 for generating a trajectory of a vehicle by mixing autonomously generated and remotely generated vehicle trajectories is described, in accordance with various embodiments of the present disclosure.

At 505, one or more data points may be generated from one or more sensors coupled to a vehicle. According to various embodiments, the one or more data points may pertain to one or more of an environment of the vehicle and one or more system component measurements of the vehicle.

According to various embodiments, the vehicle may comprise a controller. The controller may comprise a processor and/or a memory. The controller may comprise, or be a component of, a computing device such as, e.g., computing device 130. At 510, via the controller, an automatic trajectory command may be generated based on the one or more data points generated from the one or more sensors. The automatic trajectory command may comprise one or more automatic trajectory instructions which comprise one or more automatic trajectory plot points. Each automatic trajectory plot point, of the one or more automatic trajectory plot points, may comprise position coordinates for the vehicle to be at a designated time.

At 515, via the controller, one or more driving actions may be generated, based on the one or more automatic trajectory plot points. The one or more driving actions may correlate to one or more actuator commands configured to cause the vehicle to be positioned in accordance with the one or more automatic trajectory plot points.

At 520, the one or more data points generated by the one or more sensors may be received by a remote station system. At 525, via the remote station system, a remote trajectory command may be generated. The remote trajectory command may comprise trajectory instructions which comprise one or more trajectory plot points. Each trajectory plot point, of the one or more trajectory plot points, may comprise position coordinates for the vehicle to be at a designated time. At 530, via the remote station system, one or more driving actions may be generated, based on the one or more trajectory plot points. The one or more driving actions may correlate to one or more actuator commands configured to cause the vehicle to be positioned in accordance with the one or more trajectory plot points over a set timeframe. According to various embodiments, the set timeframe may be 15 seconds. It is noted, however, that other suitable set timeframes may be incorporated (e.g., 5 seconds, 10 seconds, etc.) while maintaining the spirit and functionality of the present disclosure. According to various embodiments, the one or more trajectory plot points may comprise trajectory plot points generated in 0.1 second intervals. It is noted, however, that other suitable time intervals may be incorporated, while maintaining the spirit and functionality of the present disclosure. According to various embodiments, the remote station system may comprise one or more remote actuation controls configured generate the one or more driving actions of the remote trajectory command. According to various embodiments, the one or more actuation controls may comprise a brake pedal, an acceleration pedal, a gear shift control, a steering wheel, and/or one or more other suitable actuation controls. At 535, via the remote station system, the trajectory command may be transmitted (via, e.g., a transmitter) to the vehicle; and At 540, via the controller, it may be determined whether the remote trajectory command is present for a predetermined timeframe, when the remote trajectory command is not present for the predetermined timeframe, then, at 545, via the one or more actuation controls, the vehicle is caused to perform the one or more driving actions during the predetermined timeframe in accordance with the automatic trajectory command.

At 550, when the remote trajectory command is present for the predetermined timeframe, it is determined whether the remote trajectory command is different from the automatic trajectory command. When the remote trajectory command is not different from the automatic trajectory command, then, at 545, via the one or more actuation controls, the vehicle is caused to perform the one or more driving actions during the predetermined timeframe in accordance with the automatic trajectory command.

When the remote trajectory command is different from the automatic trajectory command, then, at 555, via the one or more actuation controls, the vehicle is caused to perform the one or more driving actions during the predetermined timeframe in accordance with the remote trajectory command.

Figure 6:
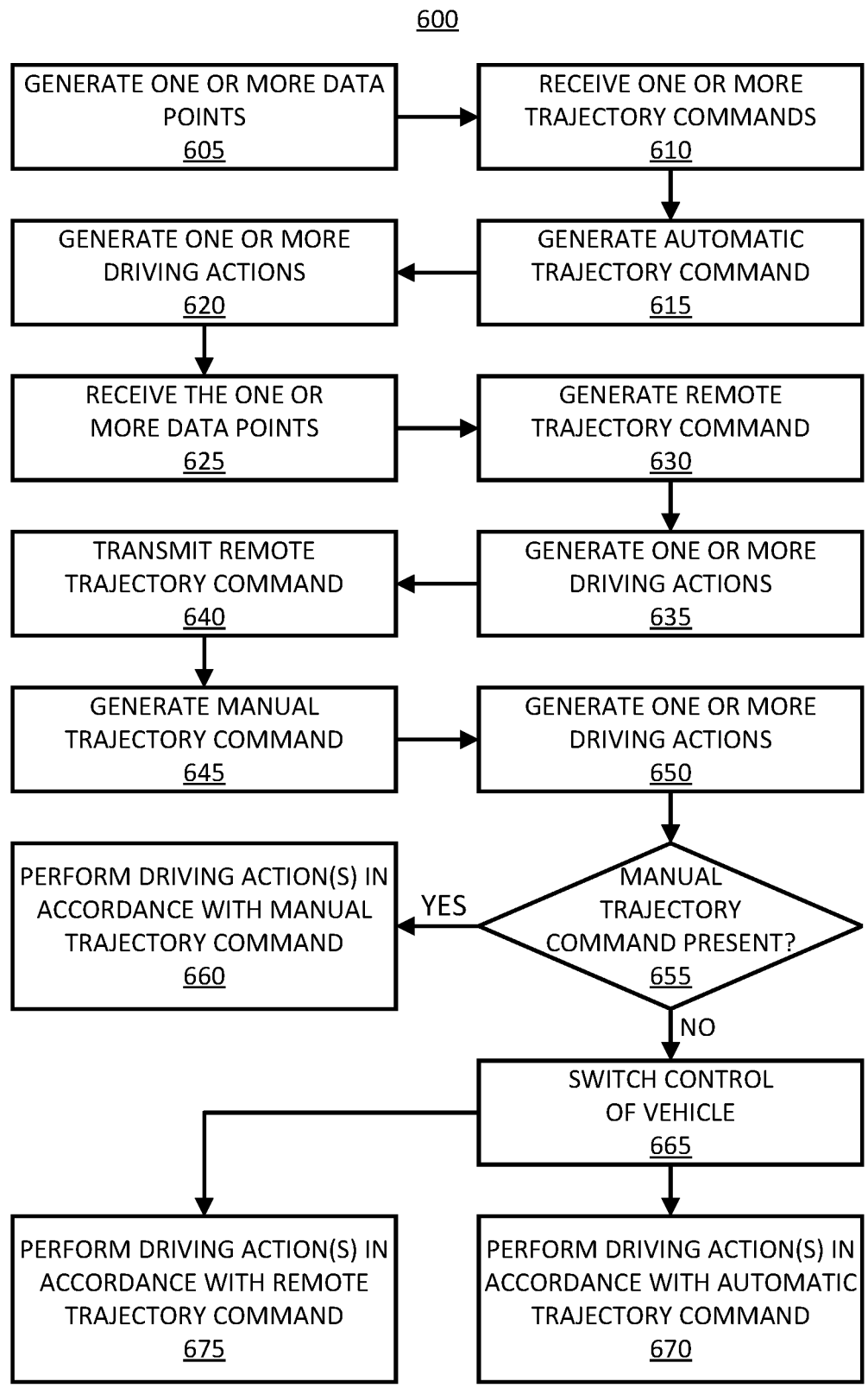
FIG. 6 is an example flowchart of a method for controlling a vehicle incorporating remote, in-vehicle, and autonomously generated data, according to various embodiments of the present disclosure.

Referring now to FIG. 6, an example flowchart of a method 600 for controlling a vehicle incorporating remote, in-vehicle, and autonomously generated data is described, in accordance with various embodiments of the present disclosure.

At 605, one or more data points may be generated from one or more sensors coupled to a vehicle. According to various embodiments, the one or more data points may pertain to one or more of an environment of the vehicle and one or more system component measurements of the vehicle.

According to various embodiments, the vehicle may comprise a controller. The controller may comprise a processor and/or a memory. The controller may comprise, or be a component of, a computing device such as, e.g., computing device 130. At 610, the controller may receive one or more trajectory commands. According to various embodiments, each of the one or more trajectory commands may comprise trajectory instructions which comprise one or more trajectory plot points. Each trajectory plot point, of the one or more trajectory plot points, may comprise position coordinates for the vehicle to be at a designated time. The one or more trajectory commands may comprise a manual trajectory command, a remote trajectory command, and/or an automatic trajectory command.

At 615, via the controller, the automatic trajectory command may be automatically generated based on the one or more data points generated from the one or more sensors and, at 620, based on the one or more trajectory plot points of the automatic trajectory command, one or more driving actions may be generated. The one or more driving actions may correlate to one or more actuator commands configured to cause the vehicle to be positioned in accordance with the one or more trajectory plot points of the automatic trajectory command.

At 625, via a remote station system comprising one or more remote actuation controls configured generate the one or more driving actions of the remote trajectory command, the one or more data points generated by the one or more sensors may be received. At 630, via the remote station system, the remote trajectory command may be generated when adjustment of the one or more remote actuation controls is manually applied. At 635, via the remote station system, one or more driving actions may be generated, based on the one or more trajectory plot points of the remote trajectory command. The one or more driving actions may correlate to one or more actuator commands configured to cause the vehicle to be positioned in accordance with the one or more trajectory plot points of the remote trajectory command. At 640, via the remote station system, the remote trajectory command may be transmitted to the vehicle.

At 645, when adjustment of the one or more actuation controls is manually applied, the manual trajectory command may be generated and, at 650, one or more driving actions may be generated, based on the one or more trajectory plot points of the manual trajectory command. The one or more driving actions may correlate to one or more actuator commands configured to cause the vehicle to be positioned in accordance with the one or more trajectory plot points of the manual trajectory command. The one or more driving actions may correlate to one or more actuator commands configured to cause the vehicle to be positioned in accordance with the one or more trajectory plot points over a set timeframe. According to various embodiments, the set timeframe may be 15 seconds. It is noted, however, that other suitable set timeframes may be incorporated (e.g., 5 seconds, 10 seconds, etc.) while maintaining the spirit and functionality of the present disclosure. According to various embodiments, the one or more trajectory plot points may comprise trajectory plot points generated in 0.1 second intervals. It is noted, however, that other suitable time intervals may be incorporated, while maintaining the spirit and functionality of the present disclosure. According to various embodiments, the remote station system may comprise one or more remote actuation controls configured generate the one or more driving actions of the remote trajectory command. According to various embodiments, the one or more actuation controls may comprise a brake pedal, an acceleration pedal, a gear shift control, a steering wheel, and/or one or more other suitable actuation controls.

At 655, via the controller, it may be determined whether the manual trajectory command is present. At 660, when the manual trajectory command is present, the vehicle may be caused, via the one or more actuation controls, to perform the one or more driving actions in accordance with the manual trajectory command, enabling manual control to take precedence.

At 665, via a switch, when the manual trajectory command is not present, command of the vehicle may be switched between automatic trajectory control and remote station system control. At 670, via the controller, when command of the vehicle is switched to automatic trajectory control, the vehicle, via the one or more actuation controls, may be caused to perform the one or more driving actions in accordance with the automatic trajectory command. At 675, via the controller, when command of the vehicle is switched to remote trajectory control, the vehicle, via the one or more actuation controls, may be caused to perform the one or more driving actions in accordance with the remote trajectory command.

Figure 7:
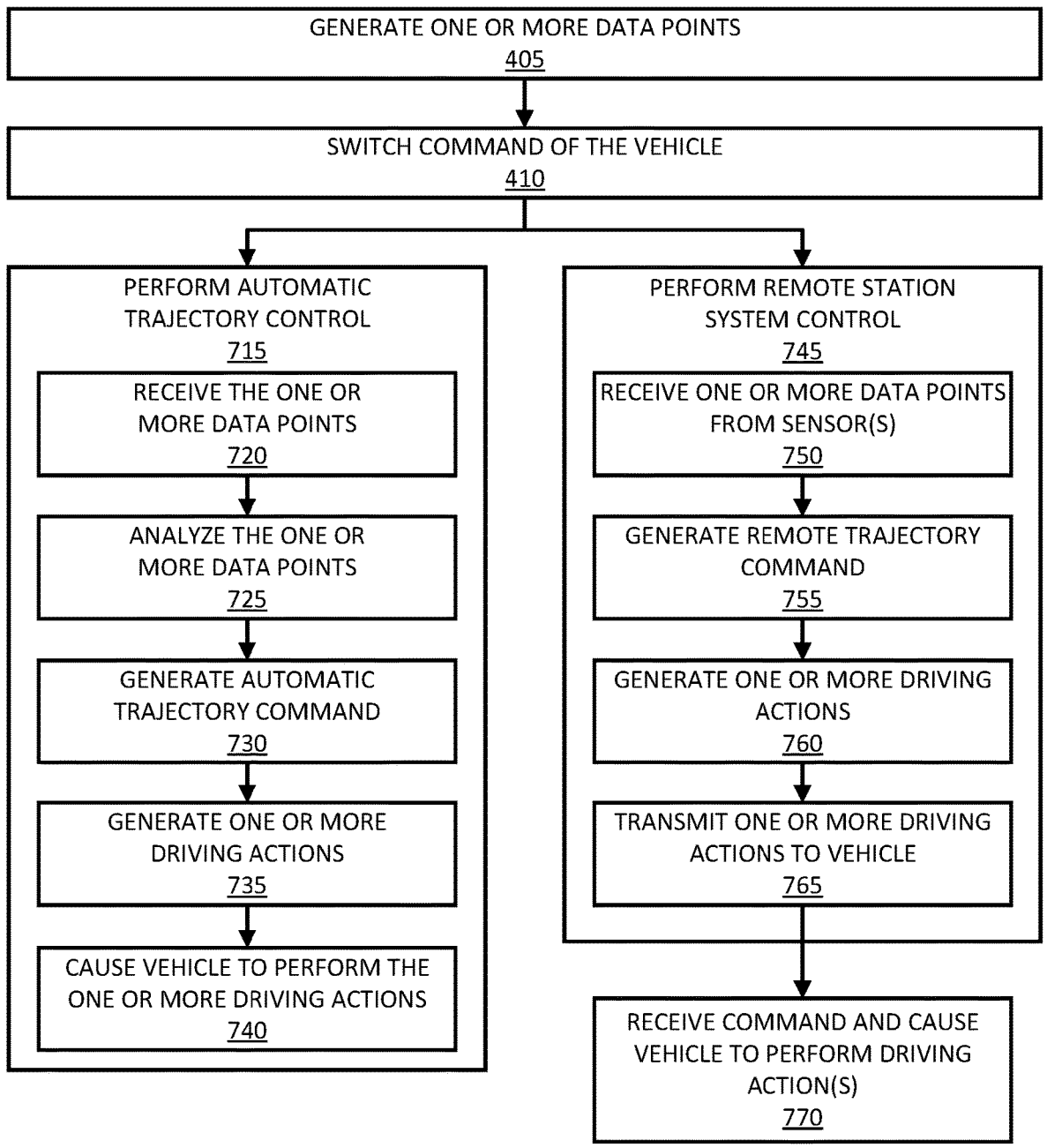
FIG. 7 is an example flowchart of a method for controlling movement of a vehicle based on perception and planner data, according to various embodiments of the present disclosure.

Referring now to FIG. 7, an example flowchart of a method 700 for controlling movement of a vehicle based on perception and planner data is described, in accordance with various embodiments of the present disclosure.

At 705, one or more data points may be generated from one or more sensors coupled to a vehicle. According to various embodiments, the one or more data points may pertain to one or more of an environment of the vehicle and one or more system component measurements of the vehicle.

At 710, using a switch, command of the vehicle may be switched between an automatic trajectory control and a remote station system control. According to various embodiments, the switch between automatic trajectory control and remote station system control may be automatic, manual, and/or a combination of automatic and manual. According to various embodiments, the switch may be optional, and vehicle control may be performed using automatic trajectory control, remote station system control, and/or manual control.

At 715, when command of the vehicle is switched to automatic trajectory control, the automatic trajectory control may be performed. According to various embodiments, the automatic trajectory control may be performed using a computing device, a processor, and/or other suitable components. According to various embodiments, performing the automatic trajectory control may comprise, at 720, receiving the one or more data points generated by the one or more sensors, and, at 725, analyzing the one or more data points to detect and/or label one or more obstacles within an environment of the vehicle. According to various embodiments, the analyzing the one or more data points to detect and/or label the one or more obstacles within the environment of the vehicle may be performed in conjunction with the steps described in method 800 of FIG. 8.

According to various embodiments, the one or more obstacles may comprise one or more pavement markings, and the analyzing the one or more data points may comprise, based on the one or more data points generated by the one or more sensors, determining a portion of the environment of the vehicle. The portion of the environment may comprise an area having a likelihood, greater than a minimum threshold, of being adjacent to one or more pavement markings.

At 730, an automatic trajectory command may be automatically generated based on the analysis of the one or more data points generated from the one or more sensors. The automatic trajectory command may comprise one or more automatic trajectory instructions which comprise one or more automatic trajectory plot points. Each automatic trajectory plot point, of the one or more automatic trajectory plot points, may comprise one or more position coordinates for the vehicle to be at a designated time According to various embodiments, performing the automatic trajectory control may comprise, at 735, generating, based on the one or more automatic trajectory plot points, one or more driving actions. The one or more driving actions may correlate to one or more actuator commands configured to cause the vehicle to be positioned in accordance with the one or more automatic trajectory plot points. According to various embodiments, performing the automatic trajectory control may comprise, at 740, causing the vehicle, via the one or more actuation controls, to perform the one or more driving actions in accordance with the automatic trajectory command.

At 745, when command of the vehicle is switched to remote station system control, the remote station system control may be performed via a remote station system. According to various embodiments, the remote station system control may be performed using a computing device, a processor, and/or other suitable components. According to various embodiments, performing the remote station system control may comprise, via the remote station system, receiving, at 750, the one or more data points generated by the one or more sensors, and generating, at 755, a remote trajectory command. The remote trajectory command may comprise trajectory instructions which comprise one or more remote trajectory plot points. According to various embodiments, each trajectory plot point, of the one or more remote trajectory plot points, may comprise position coordinates for the vehicle to be at a designated time.

According to various embodiments, performing the remote station system control may comprise, via the remote station system, generating, at 760, based on the one or more remote trajectory plot points, one or more driving actions. The one or more driving actions may correlate to one or more actuator commands configured to cause the vehicle to be positioned in accordance with the one or more remote trajectory plot points over a set timeframe. According to various embodiments, the set timeframe may be 15 seconds. It is noted, however, that other suitable set timeframes may be incorporated (e.g., 5 seconds, 10 seconds, etc.) while maintaining the spirit and functionality of the present disclosure. According to various embodiments, the one or more trajectory plot points may comprise trajectory plot points generated in 0.1 second intervals. It is noted, however, that other suitable time intervals may be incorporated, while maintaining the spirit and functionality of the present disclosure. According to various embodiments, the remote station system may comprise one or more remote actuation controls configured generate the one or more driving actions of the remote trajectory command. According to various embodiments, the one or more actuation controls may comprise a brake pedal, an acceleration pedal, a gear shift control, a steering wheel, and/or one or more other suitable actuation controls. According to various embodiments, the one or more driving actions of the remote trajectory command may be generated using the one or more remote actuation controls. According to various embodiments, the remote station system may comprise one or more displays configured to display the one or more images of the environment of the vehicle, and the performing the remote station system control may comprise displaying the one or more images of the environment of the vehicle, using the one or more displays.

According to various embodiments, performing the remote station system control may comprise, via the remote station system, transmitting, at 765, the trajectory command to the vehicle. According to various embodiments, the vehicle may comprise a control module configured to receive the transmitted remote trajectory command. The control module, at 770, may receive the remote trajectory command and cause the vehicle, via one or more actuation controls, to perform the one or more driving actions in accordance with the remote trajectory command.

Figure 8A:
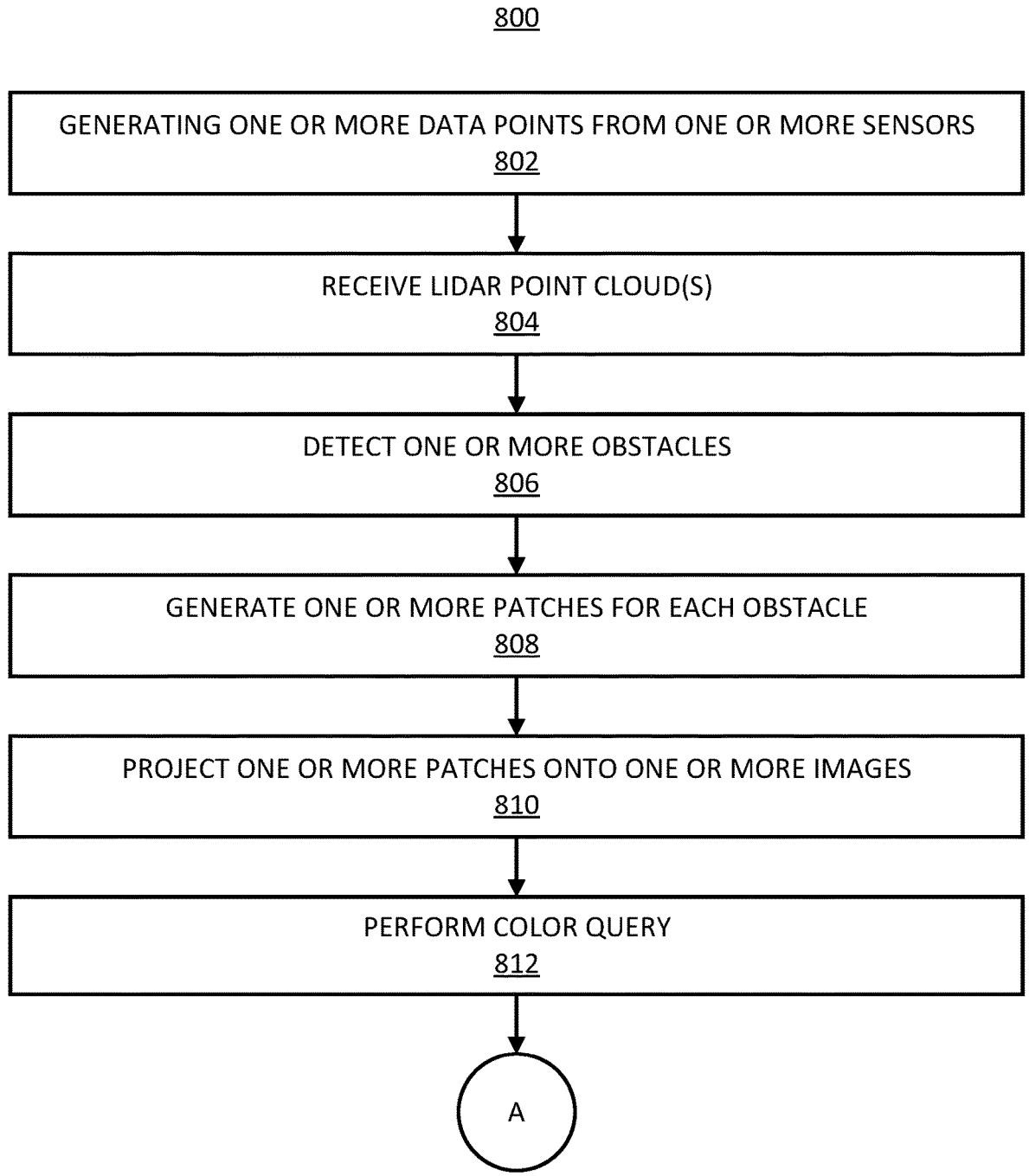
FIGS. 8A-8B are an example flowchart of a method for detecting and identifying obstacles within a vehicle environment and adjusting driving instructions for vehicle accordingly, according to various embodiments of the present disclosure.
Figure 8B:
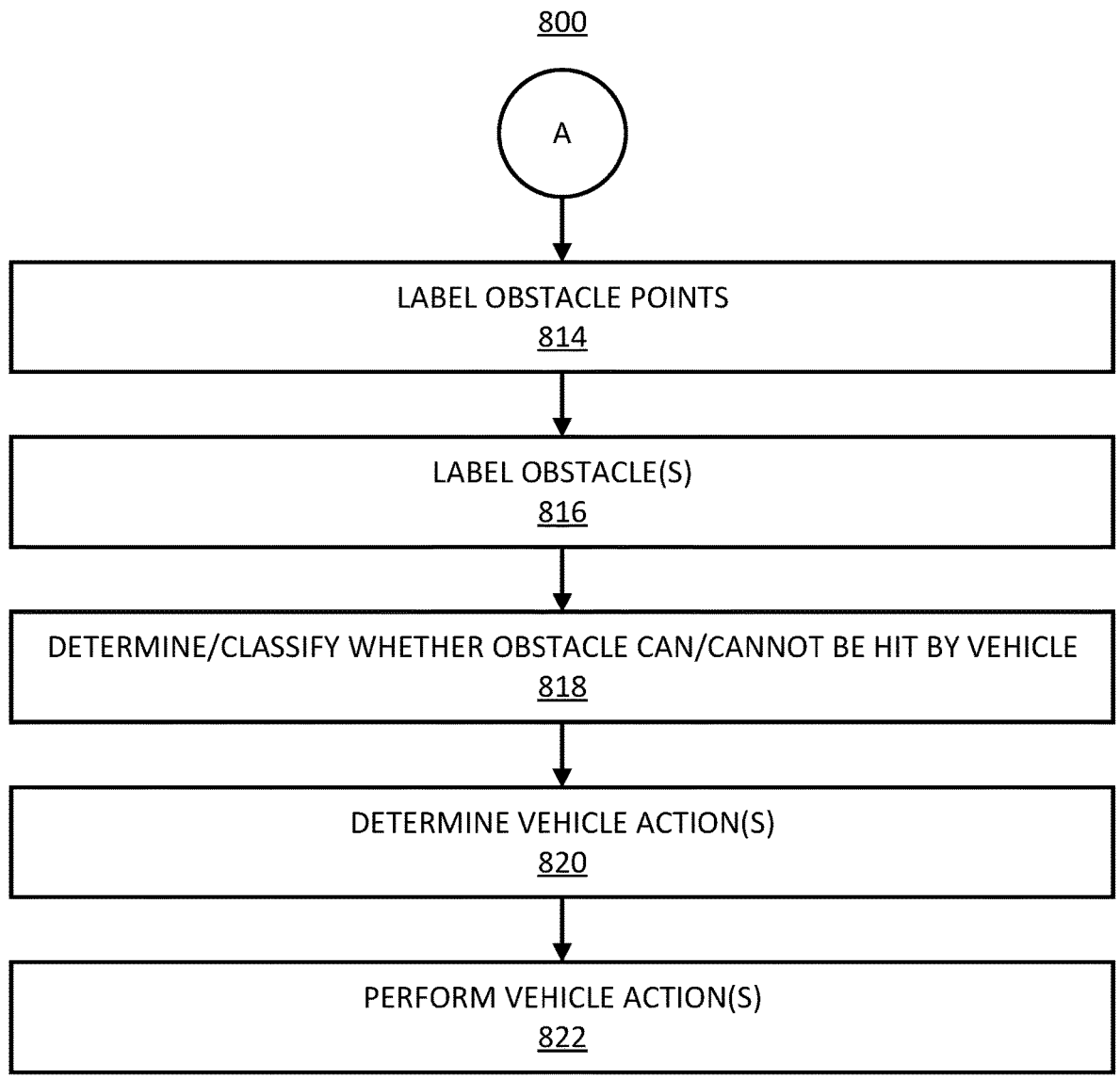

Referring now to FIGS. 8A-8B, an example flowchart of a method 800 method for detecting and identifying obstacles within a vehicle environment and adjusting driving instructions for vehicle is described, in accordance with various embodiments of the present disclosure.

At 802, one or more data points are collected, generated, and/or produced by one or more sensors, (e.g., one or more LiDAR sensors, one or more radio detection and ranging (RADAR) sensors, and one or more cameras, one or more ultrasonic transducers, and/or other suitable sensors). According to various embodiments, the one or more data points comprise one or more LiDAR point clouds and one or more camera images for a specified capture time.

According to various embodiments, the one or more LiDAR point clouds may be generated using a LiDAR system including one or more LiDAR sensors and at least one computer memory and computer processor. According to various embodiments, the one or more LiDAR point clouds may be representative of all or part of a vehicle's surrounding environment. The LiDAR point cloud may, e.g., be from a combination of different types of LiDAR sensors. For example, scanning LiDAR sensors, spinning LiDAR sensors, flash LiDAR sensors, and/or other suitable types of LiDAR sensor may be combines in the LiDAR point cloud.

At 804, the one or more LiDAR point clouds are received by a high recall obstacle detector which, at 806, detects one or more obstacles within the one or more LiDAR point clouds. Any known or to be known technique for making an obstacle detection based on sensor data and/or captured images may be used in the embodiments disclosed in this document. According to various embodiments, at 808, one or more patches may be generated for each of one or more detected obstacles within the LiDAR point cloud.

At 810, the one or more LiDAR point clouds, with or without the one or more patches, are projected onto the one or more camera images for the specified capture time. The one or more point clouds may take the form of one or more 2-dimensional (2D) boxed or bounding boxes.

According to various embodiments, at 812, for each obstacle patch projected onto the one or more camera images, a factor query may be performed. The factor query may comprise a color query, a shape query, a movement query, and/or one or more other queries for one or more other suitable factors. According to various embodiments, during the factor query, a factor (e.g., a color, shape, movement, etc.) may be queried, for one or more factor features (e.g., one or more color features, one or more shape features, one or more movement features, etc.), for each of one or more points of the one or more images.

At 814, based in whole or in part on results of the factor query, each of the one or more points may be labeled.

At 816, based on the labels of each of the one or more points, a label may be assigned for each obstacle. For example, each obstacle may be labeled as a pedestrian, a vehicle, a piece of vegetation, and/or one or more other suitable type of obstacle. According to various embodiments, assigned a label for an obstacle comprises determining a label for the obstacle. According to various embodiments, the label may indicate the collidability (i.e., the ability to be collided with) of one or more obstacles. For example, according to various embodiments, the label may indicate whether an obstacle is collidable (i.e., suitable for being collided with and/or approved for collision by the vehicle) and/or not non-collidable (i.e., not non-suitable for being collided with and/or not being capable of being approved for collision by the vehicle).

According to various embodiments, determining the label for the obstacle may be performed using a suitable device, system, module, etc., such as, e.g., an image pedestrian detector, a high recall obstacle detector, an image patch not-a-pedestrian detector, an image patch vegetation detector, and an annotated high recall obstacle detector.

Figure 9:
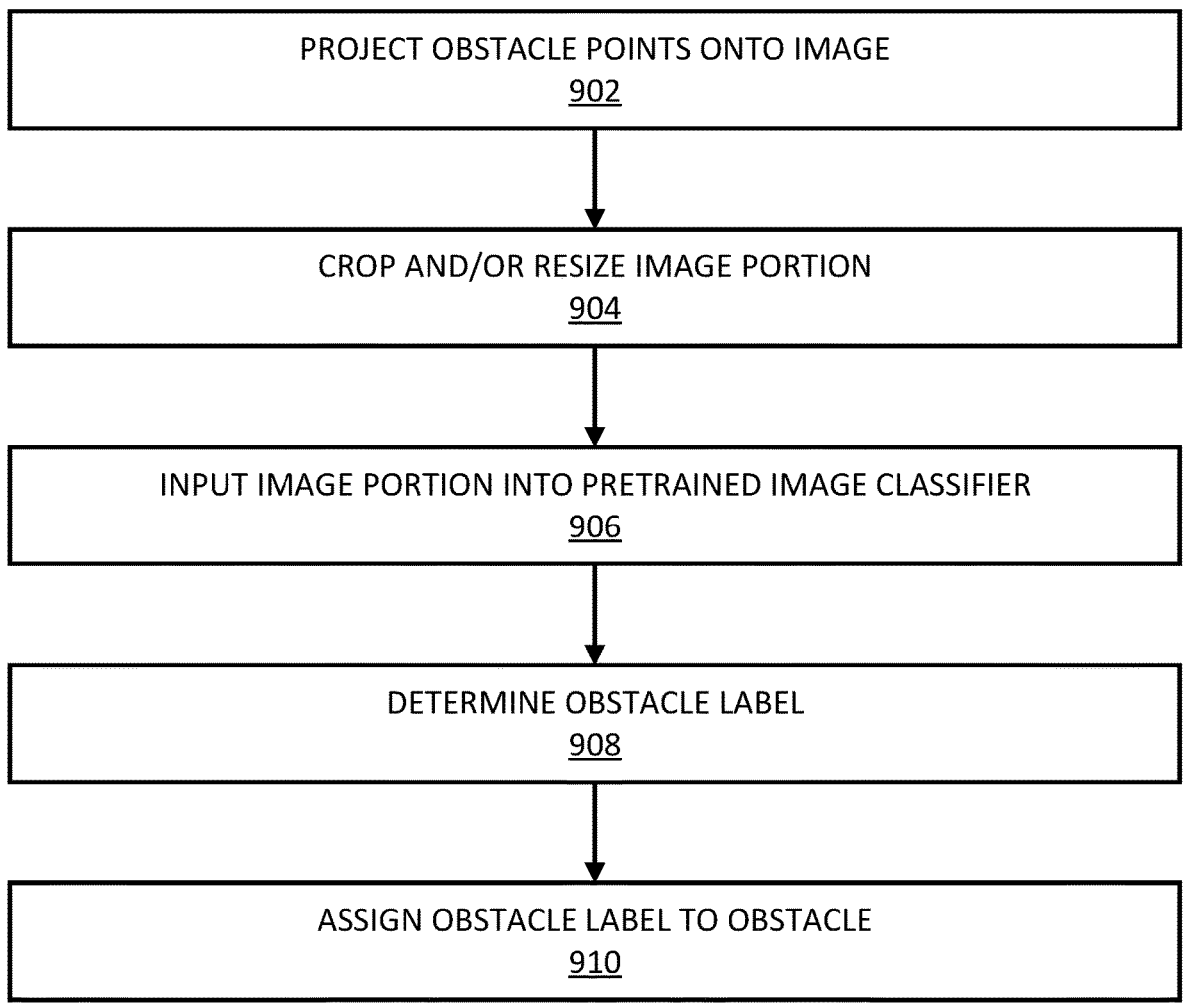
FIG. 9 is an example flowchart of a method for labeling one or more obstacles, according to various embodiments of the present disclosure.

According to various embodiments, the labeling of the obstacles, at 816 of FIG. 8, may be performed using an auto-labeling process, as shown, e.g., in FIG. 9. According to various embodiment, the auto-labeling processor may directly query the label of the obstacle from the image. During auto-labeling, obstacle points, at 902, may be projected onto an image. The obstacle points may take the form of a 2D bounding box. The portion of the image represented by the 2D bounding box may, at 904, be cropped and/or resized and preprocessed. The preprocessed and (optionally) resized portion of the image may, at 906, then be input into a pretrained image classifier. The pretrained image classifier, at 908, may analyze factors of the image portion to determine a label of the obstacle. The factors may comprise color, shape, movement, and/or one or more other suitable factors. For example, the pretrained image classifier may be configured to determine whether an obstacle is a piece of vegetation based on one or more shapes, colors, movement, and/or other factors of the obstacle. The pretrained image classifier may, at 910, assign the determined label to the obstacle.

According to various embodiments, at 818, each obstacle may be analyzed to determine whether the obstacle can or cannot be hit by the vehicle. According to various embodiments, the perception system may be configured to determine whether the obstacle is something that the vehicle can hit, classify the obstacle as something that the vehicle can hit when the it is determined that the obstacle is something that the vehicle can hit, determine whether the obstacle is not something that the vehicle cannot hit, and classify the obstacle as not something that the vehicle cannot hit when the it is determined that the obstacle is not something that the vehicle cannot hit. According to various embodiments, vehicles and pedestrians may be obstacles that the vehicle cannot hit, and pieces of vegetation (or certain types of pieces of vegetation) may be obstacles that the vehicle can hit and not obstacles that the vehicle cannot hit. However, any suitable label for objects which can be hit by the vehicle and/or cannot be hit by the vehicle may be incorporated, while maintaining the spirit and functionality of the present disclosure.

At 820, based on one or more of the labels of the obstacle, the classification of whether the vehicle can hit the obstacle, the classification of whether the vehicle cannot not hit the obstacle, and the classification of whether the vehicle cannot hit the object, the planning module may determine one or more actions for the vehicle to take. The one or more actions may comprise altering a speed of the vehicle (e.g., increase speed, decrease speed, stop, etc.), altering a trajectory of the vehicle (e.g., a direction of the vehicle, a path for the vehicle to take, a final destination of the vehicle, etc.), and/or other suitable actions. At 822, the planning module may cause the vehicle to perform the one or more actions.

Figure 10:
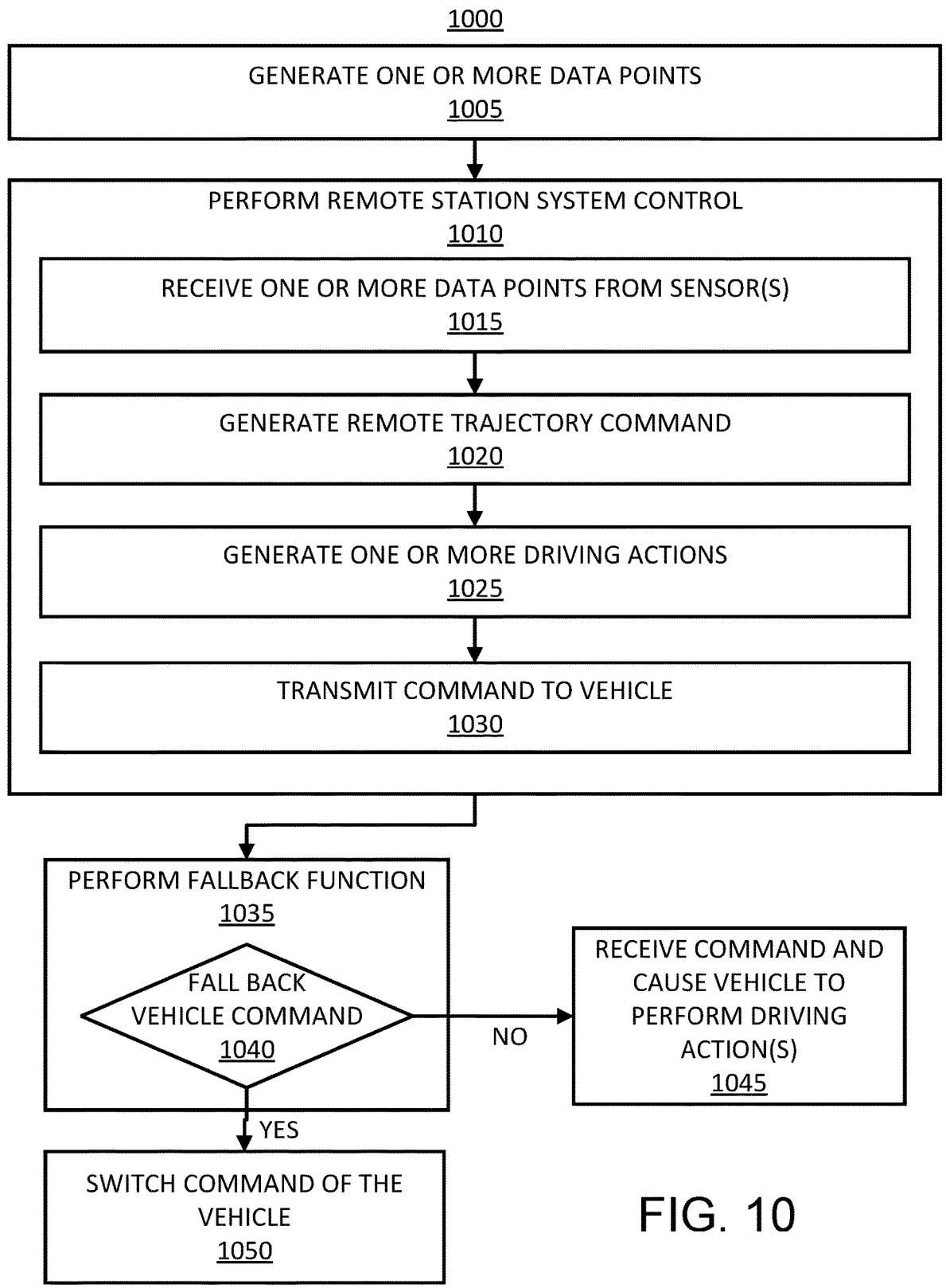
FIG. 10 is an example flowchart of a method for vehicle control using fallback-enabled remote operation, according to various embodiments of the present disclosure.

Referring now to FIG. 10, an example flowchart of a method 1000 for vehicle control using fallback-enabled remote operation is described, in accordance with various embodiments of the present disclosure.

At 1005, one or more data points may be generated from one or more sensors coupled to a vehicle. According to various embodiments, the one or more data points may pertain to one or more of an environment of the vehicle and one or more system component measurements of the vehicle.

At 1010, remote station system control may be performed via a remote station system. According to various embodiments, the remote station system control may be performed using a computing device, a processor, and/or other suitable components. According to various embodiments, performing the remote station system control may comprise, via the remote station system, receiving, at 1015, the one or more data points generated by the one or more sensors, and generating, at 1020, a remote trajectory command. The remote trajectory command may comprise trajectory instructions which comprise one or more remote trajectory plot points. According to various embodiments, each trajectory plot point, of the one or more remote trajectory plot points, may comprise position coordinates for the vehicle to be at a designated time.

According to various embodiments, performing the remote station system control may comprise, via the remote station system, generating, at 1025, based on the one or more remote trajectory plot points, one or more driving actions. The one or more driving actions may correlate to one or more actuator commands configured to cause the vehicle to be positioned in accordance with the one or more remote trajectory plot points over a set timeframe. According to various embodiments, the set timeframe may be 15 seconds. It is noted, however, that other suitable set timeframes may be incorporated (e.g., 5 seconds, 10 seconds, etc.) while maintaining the spirit and functionality of the present disclosure. According to various embodiments, the one or more trajectory plot points may comprise trajectory plot points generated in 0.1 second intervals. It is noted, however, that other suitable time intervals may be incorporated, while maintaining the spirit and functionality of the present disclosure. According to various embodiments, the remote station system may comprise one or more remote actuation controls configured generate the one or more driving actions of the remote trajectory command. According to various embodiments, the one or more actuation controls may comprise a brake pedal, an acceleration pedal, a gear shift control, a steering wheel, and/or one or more other suitable actuation controls. According to various embodiments, the one or more driving actions of the remote trajectory command may be generated using the one or more remote actuation controls. According to various embodiments, the remote station system may comprise one or more displays configured to display the one or more images of the environment of the vehicle, and the performing the remote station system control may comprise displaying the one or more images of the environment of the vehicle, using the one or more displays. According to various embodiments, performing the remote station system control may comprise, via the remote station system, transmitting, at 1030, the trajectory command to the vehicle.

According to various embodiments, a fallback function, at 1035, may be performed. According to various embodiments, the fallback function may comprise, at 1040, determining whether command of the vehicle should fall back to one or more secondary control modes (e.g., an automatic trajectory control mode (as shown, e.g., in FIGS. 4-7), a manual control mode (as shown, e.g., in FIG. 6), and/or other suitable control modes).

According to various embodiments, the determining whether command of the vehicle should fall back to the one or more secondary control modes may comprise assigning, to the remote trajectory command, a key, and, when the remote trajectory command does not comprise the key, determining that command of the vehicle should fall back to the one or more secondary control modes.

According to various embodiments, the determining whether command of the vehicle should fall back to the one or more secondary control modes may comprise determining whether a kill switch has been activated and, when the kill switch has been activated, generating a fallback command configured to cause command of the vehicle to fall back to the one or more secondary control modes. According to various embodiments, the fallback command may be configured to prevent implementation of any non-fallback commands. According to various embodiments, the kill switch may be activated when bandwidth is below a threshold value, when it manually activated, and/or when one or more other suitable activation events occur.

According to various embodiments, the determining whether command of the vehicle should fall back to the one or more secondary control modes may comprise determining whether the remote station system meets a minimum integrity level, and, when the remote station system does not meet the minimum integrity level, determining that command of the vehicle should fall back to the one or more secondary control modes.

When it is determined that the command of the vehicle should not fall back to the one or more secondary control modes, command of the vehicle remains in remote station system control and the control module, at 1045, may receive the remote trajectory command and cause the vehicle, via one or more actuation controls, to perform the one or more driving actions in accordance with the remote trajectory command.

When it is determined that the command of the vehicle should fall back to the one or more secondary control modes, then, at 1050, using a switch, command of the vehicle may be switched from the remote station system control to the one or more secondary control modes.

Figure 11:
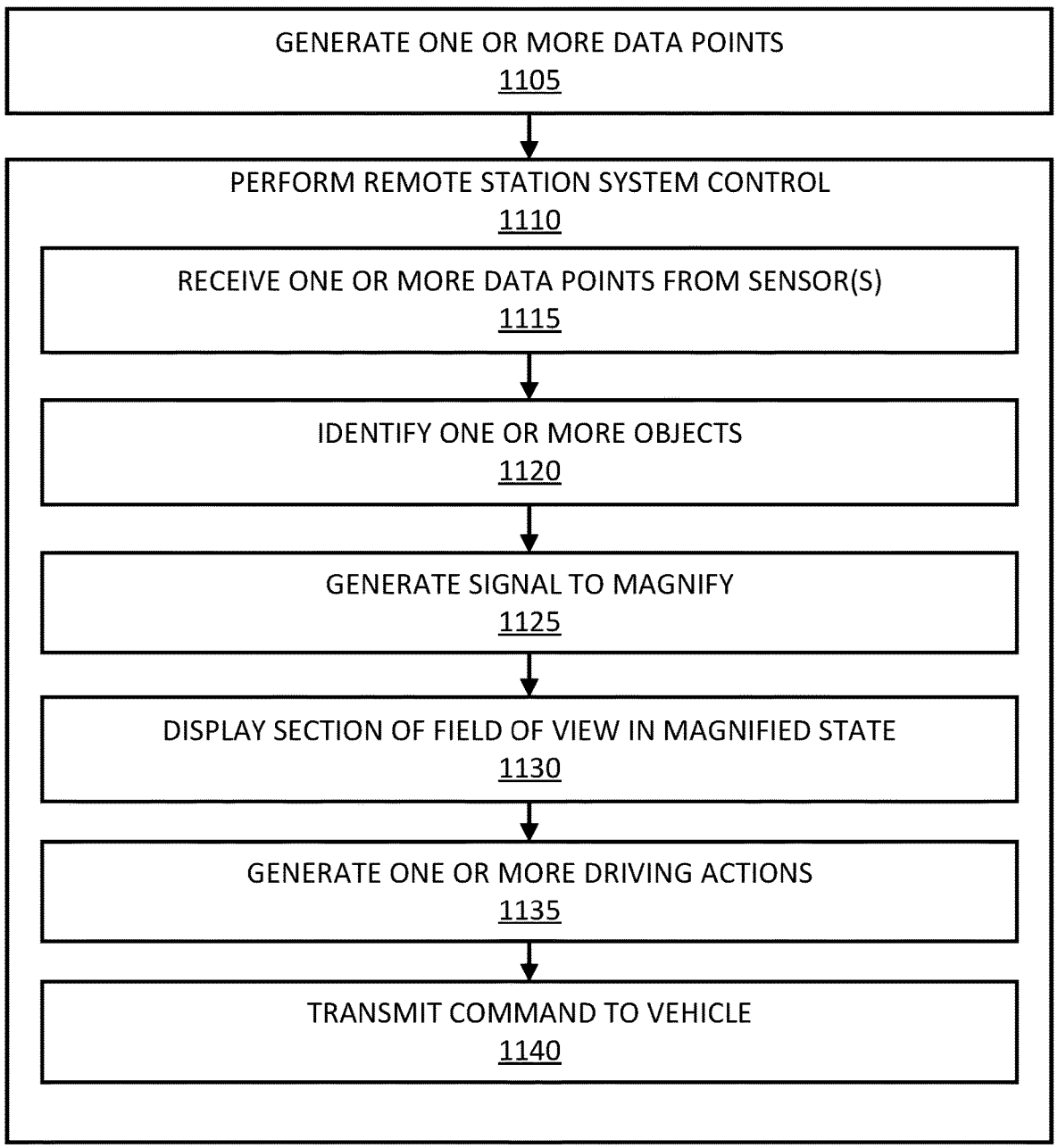
FIG. 11 is an example flowchart of a method for vehicle control using object magnification, according to various embodiments of the present disclosure.

Referring now to FIG. 11, an example flowchart of a method 1100 for vehicle control using object magnification is described, in accordance with various embodiments of the present disclosure.

At 1105, one or more data points may be generated from one or more sensors coupled to a vehicle. The one or more sensors may comprise one or more LiDAR sensors, one or more cameras, one or more IMUs, and/or other suitable sensors. According to various embodiments, the one or more data points may pertain to one or more of an environment of the vehicle and one or more system component measurements of the vehicle. According to various embodiments, the one or more data points may comprise a position (e.g., a geographic position, a position along a map, etc.) of the vehicle.

At 1110, remote station system control may be performed via a remote station system. According to various embodiments, the remote station system control may be performed using a computing device, a processor, and/or other suitable components. According to various embodiments, performing the remote station system control may comprise, via the remote station system, receiving, at 1115, the one or more data points generated by the one or more sensors.

According to various embodiments, at 1120, one or more objects within a field of view of the vehicle may be identified. According to various embodiments, the one or more objects may be identified using, e.g., the one or more data points. According to various embodiments, the one or more objects may comprise signage, traffic signals, pedestrians, vehicles, and/or other suitable objects.

According to various embodiments, the one or more objects may comprise one or more known objects having a known position (e.g., one or more objects known to exist along a predetermined map), and identifying the one or more known objects may comprise, for each known object, associating the known object with a known position, creating a waypoint position for each of the one or more known objects.

At 1125, a signal to magnify a section of the field of view of the vehicle may be generated.

According to various embodiments, the section of the field of view of the vehicle may contain the one or more objects may be generated. The signal may comprise one or more coordinates of the field of view to magnify. According to various embodiments, the remote station system may comprise a user interface configured to enable a user to manually select the section of the field of view to magnify.

According to various embodiments, when the position of the vehicle is equal to the waypoint position associated with a known object, of the one or more known objects, the signal may be configured to magnify the section of the field of view of the vehicle containing the known object associated with that waypoint.

According to various embodiments, using a display, at 1130, the one or more data points generated by the one or more sensors may be displayed, and/or the one or more objects may be displayed in a magnified state. According to various embodiments, the one or more objects may comprise at least one known object, of the one or more known objects.

According to various embodiments, a remote trajectory command may be generated. The remote trajectory command may comprise trajectory instructions which comprise one or more remote trajectory plot points. According to various embodiments, each trajectory plot point, of the one or more remote trajectory plot points, may comprise position coordinates for the vehicle to be at a designated time.

According to various embodiments, performing the remote station system control may comprise, via the remote station system, generating, at 1135, based on the one or more remote trajectory plot points, one or more driving actions. The one or more driving actions may correlate to one or more actuator commands configured to cause the vehicle to be positioned in accordance with the one or more remote trajectory plot points over a set timeframe. According to various embodiments, the set timeframe may be 15 seconds. It is noted, however, that other suitable set timeframes may be incorporated (e.g., 5 seconds, 10 seconds, etc.) while maintaining the spirit and functionality of the present disclosure. According to various embodiments, the one or more trajectory plot points may comprise trajectory plot points generated in 0.1 second intervals. It is noted, however, that other suitable time intervals may be incorporated, while maintaining the spirit and functionality of the present disclosure. According to various embodiments, the remote station system may comprise one or more remote actuation controls configured generate the one or more driving actions of the remote trajectory command. According to various embodiments, the one or more actuation controls may comprise a brake pedal, an acceleration pedal, a gear shift control, a steering wheel, and/or one or more other suitable actuation controls. According to various embodiments, the one or more driving actions of the remote trajectory command may be generated using the one or more remote actuation controls. According to various embodiments, the remote station system may comprise one or more displays configured to display the one or more images of the environment of the vehicle, and the performing the remote station system control may comprise displaying the one or more images of the environment of the vehicle, using the one or more displays. According to various embodiments, performing the remote station system control may comprise, via the remote station system, transmitting, at 1140, the trajectory command to the vehicle.

Figure 12:
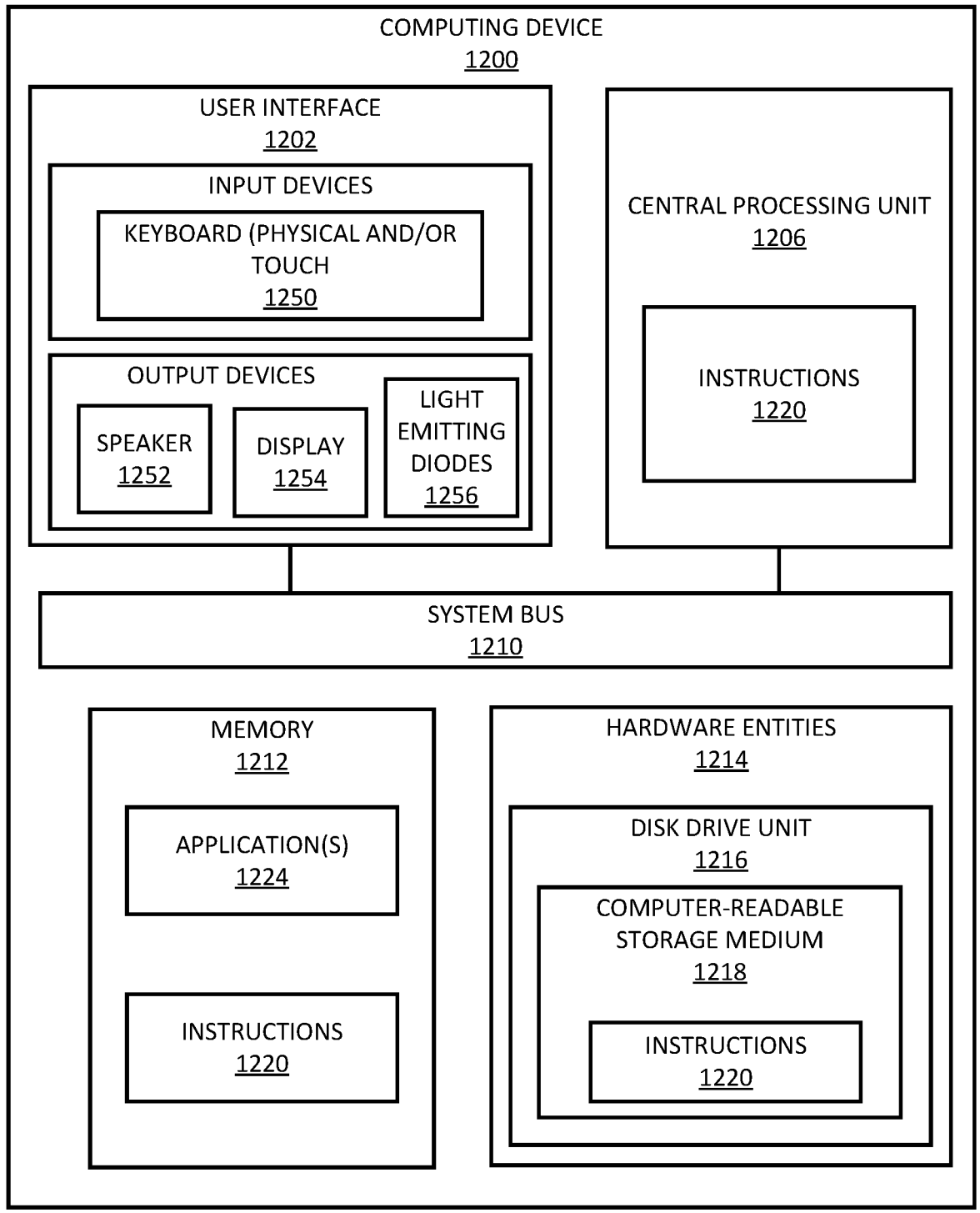
FIG. 12 illustrates example elements of a computing device, according to various embodiments of the present disclosure.

Referring now to FIG. 12, an illustration of an example architecture for a computing device 1200 is provided. The computing device 130 of FIG. 1 may be the same as or similar to computing device 1200. As such, the discussion of computing device 1200 is sufficient for understanding the computing device 130 of FIG. 1, for example.

Computing device 1200 may comprise greater or fewer components than those shown in FIG. 1. The hardware architecture of FIG. 12 represents one example implementation of a representative computing device configured perform to one or more methods and means for vehicle control using autonomous and remote operation, as described herein. As such, the computing device 1200 of FIG. 12 implements at least a portion of the method(s) described herein (for example, method 400 of FIG. 4, method 500 of FIG. 5, method 600 of FIG. 6, method 700 of FIG. 7, method 800 of FIG. 8, method 816 of FIG. 9, method 1000 of FIG. 10, and method 1100 of FIG. 11).

Some or all components of the computing device 1200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 12, the computing device 1200 comprises a user interface 1202, a Central Processing Unit ("CPU") 1206, a system bus 1210, a memory 1212 connected to and accessible by other portions of computing device 1200 through system bus 1210, and hardware entities 1214 connected to system bus 1210. The user interface can include input devices and output devices, which facilitate user-software interactions for controlling operations of the computing device 1200. The input devices include, but are not limited to, a physical and/or touch keyboard 1250. The input devices can be connected to the computing device 1200 via a wired or wireless connection (e.g., a Bluetooth® connection). The output devices include, but are not limited to, a speaker 1252, a display 1254, and/or light emitting diodes 1256.

At least some of the hardware entities 1214 perform actions involving access to and use of memory 1212, which can be a Random Access Memory (RAM), a disk driver and/or a Compact Disc Read Only Memory (CD-ROM), among other suitable memory types. Hardware entities 1214 can include a disk drive unit 1216 comprising a computer-readable storage medium 1218 on which is stored one or more sets of instructions 1220 (e.g., programming instructions such as, but not limited to, software code) configured to implement one or more of the methodologies, procedures, or functions described herein. The instructions 1220 can also reside, completely or at least partially, within the memory 1212 and/or within the CPU 1206 during execution thereof by the computing device 1200. The memory 1212 and the CPU 1206 also can constitute machine-readable media. The term "machine-readable media", as used here, refers to a single medium or multiple media (e.g., a centralized or distributed database, and/or associated caches and servers) that store the one or more sets of instructions 1220. The term "machine-readable media", as used here, also refers to any medium that is capable of storing, encoding or carrying a set of instructions 1220 for execution by the computing device 1200 and that cause the computing device 1200 to perform any one or more of the methodologies of the present disclosure.

Figure 13:
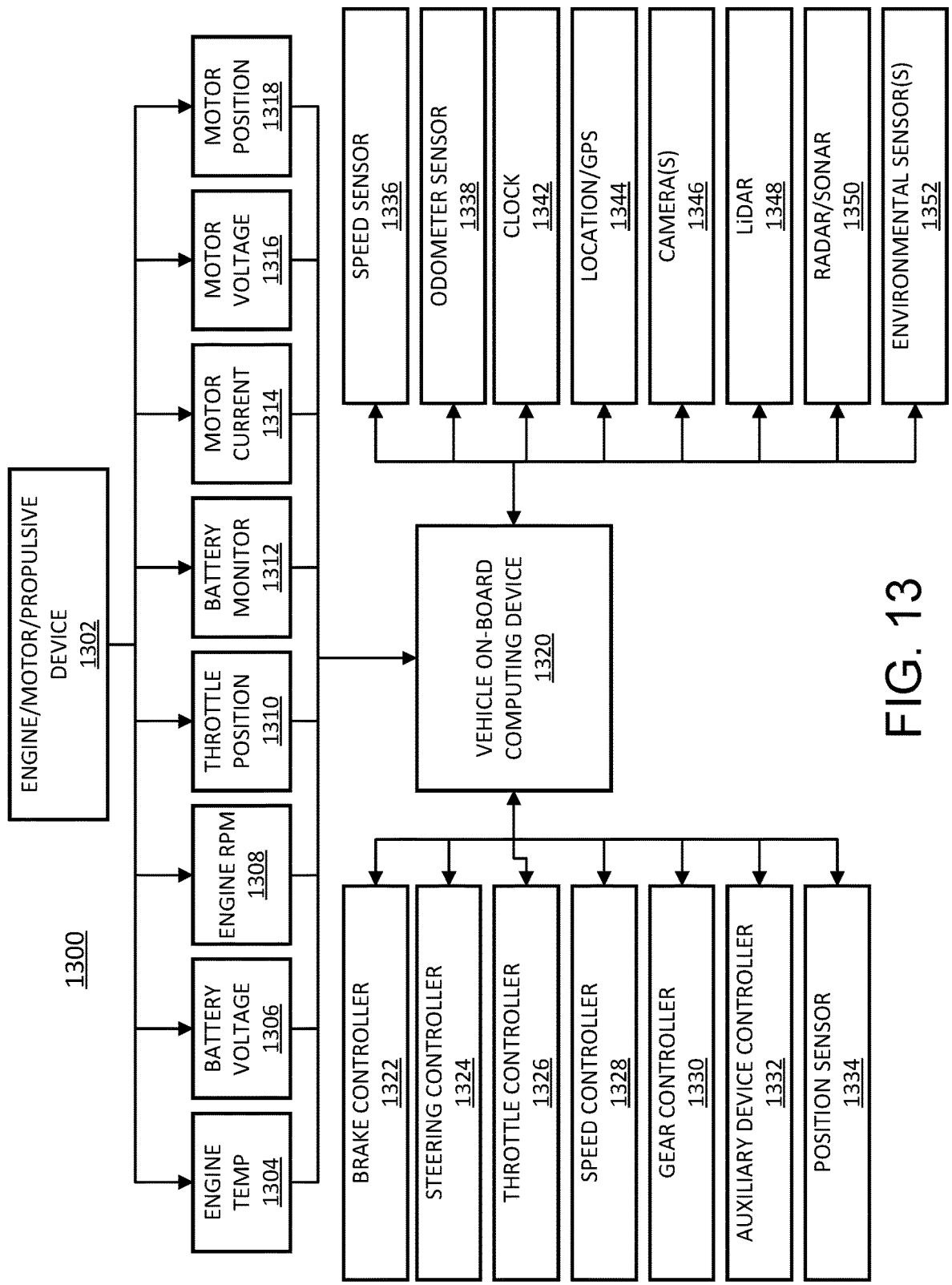
FIG. 13 shows example architecture of a vehicle, according to various embodiments of the present disclosure.

Referring now to FIG. 13, example vehicle system architecture 1300 for a vehicle is provided, in accordance with various embodiments of the present disclosure.

Vehicle 105 of FIG. 1 can have the same or similar system architecture as that shown in FIG. 13. Thus, the following discussion of vehicle system architecture 1300 is sufficient for understanding vehicle 105 FIG. 1.

As shown in FIG. 13, the vehicle system architecture 1300 includes an engine, motor or propulsive device (e.g., a thruster) 1302 and various sensors 1304-1318 for measuring various parameters of the vehicle system architecture 1300. In gas-powered or hybrid vehicles having a fuel-powered engine, the sensors 1304-1318 may comprise, for example, an engine temperature sensor 1304, a battery voltage sensor 1306, an engine Rotations Per Minute (RPM) sensor 1308, and/or a throttle position sensor 1310. If the vehicle is an electric or hybrid vehicle, then the vehicle may have an electric motor, and accordingly will have sensors such as a battery monitoring system 1312 (to measure current, voltage and/or temperature of the battery), motor current 1314 and voltage 1316 sensors, and motor position sensors such as resolvers and encoders 1318.

Operational parameter sensors that are common to both types of vehicles include, for example: a position sensor 1334 such as an accelerometer, gyroscope and/or inertial measurement unit; a speed sensor 1336, and/or an odometer sensor 1338. The vehicle system architecture 1300 also may have a clock 1342 that the system uses to determine vehicle time during operation. The clock 1342 may be encoded into the vehicle on-board computing device 1320 (e.g., computing devices 130, 1200), it may be a separate device, or multiple clocks may be available.

The vehicle system architecture 1300 also may comprise various sensors that operate to gather information about the environment in which the vehicle is traveling. These sensors may comprise, for example: a location sensor 1344 (for example, a Global Positioning System (GPS) device); object detection sensors such as one or more cameras 1346, a LIDAR sensor system 1348; and/or a radar and/or a sonar system 1350. The sensors also may comprise environmental sensors 1352 such as a precipitation sensor and/or ambient temperature sensor. The object detection sensors may enable the vehicle system architecture 1300 to detect objects that are within a given distance range of the vehicle 1300 in any direction, while the environmental sensors 1352 collect data about environmental conditions within the vehicle's area of travel.

During operations, information is communicated from the sensors to an on-board computing device 1320. The on-board computing device 1320 may be configured to analyze the data captured by the sensors and/or data received from data providers, and may be configured to optionally control operations of the vehicle system architecture 1300 based on results of the analysis. For example, the on-board computing device 1320 may be configured to control: braking via a brake controller 1322, direction via a steering controller 1324; speed and acceleration via a throttle controller 1326 (in a gas-powered vehicle) or a motor speed controller 1328 (such as a current level controller in an electric vehicle); a differential gear controller 1330 (in vehicles with transmissions); and/or other controllers.

Geographic location information may be communicated from the location sensor 1344 to the on-board computing device 1320, which may then access a map of the environment that corresponds to the location information to determine known fixed features of the environment such as streets, buildings, stop signs and/or stop/go signals. Captured images from the cameras 1346 and/or object detection information captured from sensors such as LIDAR 1348 is communicated from those sensors to the on-board computing device 1320. The object detection information and/or captured images are processed by the on-board computing device 1320 to detect objects in proximity to the vehicle. Any known or to be known technique for making an object detection based on sensor data and/or captured images may be used in the embodiments disclosed in this document.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A system for controlling a vehicle, comprising:
   a vehicle;
   one or more sensors, coupled to the vehicle, configured to generate one or more data points pertaining to one or more of:
      an environment of the vehicle; and
      one or more system component measurements of the vehicle;
   one or more actuation controls configured to enable the vehicle to perform one or more driving actions;
   a controller, comprising a processor, configured to:
      receive one or more trajectory commands, wherein:
         each of the one or more trajectory commands comprises trajectory instructions which comprise one or more trajectory plot points,
         each trajectory plot point, of the one or more trajectory plot points, comprises position coordinates for the vehicle to be at a designated time, and
         the one or more trajectory commands comprise:
            a manual trajectory command;
            a remote trajectory command; and
            an automatic trajectory command;
      automatically generate the automatic trajectory command based on the one or more data points generated from the one or more sensors; and
      generate, based on the one or more trajectory plot points of the automatic trajectory command, one or more driving actions,
         wherein the one or more driving actions correlate to one or more actuator commands configured to cause the vehicle to be positioned in accordance with the one or more trajectory plot points of the automatic trajectory command; and
   a remote station system comprising one or more remote actuation controls configured generate the one or more driving actions of the remote trajectory command, wherein the remote station system is configured to:
      receive the one or more data points generated by the one or more sensors;
      generate the remote trajectory command when adjustment of the one or more remote actuation controls is manually applied; and
      generate, based on the one or more trajectory plot points of the remote trajectory command, one or more driving actions,
         wherein the one or more driving actions correlate to one or more actuator commands configured to cause the vehicle to be positioned in accordance with the one or more trajectory plot points of the remote trajectory command; and
      transmit the remote trajectory command to the vehicle; and
   wherein:
      the one or more actuation controls are further configured to:
         generate the manual trajectory command when adjustment of the one or more actuation controls is manually applied; and
         generate, based on the one or more trajectory plot points of the manual trajectory command, one or more driving actions,
            wherein the one or more driving actions correlate to one or more actuator commands configured to cause the vehicle to be positioned in accordance with the one or more trajectory plot points of the manual trajectory command, and
      the controller is further configured to:
         determine whether the manual trajectory command is present; and
         when the manual trajectory command is present, cause the vehicle, via the one or more actuation controls, to perform the one or more driving actions in accordance with the manual trajectory command.

2. The system of claim 1, further comprising a switch configured to:
   when the manual trajectory command is not present, switch command of the vehicle between automatic trajectory control and remote station system control,
   wherein:
      when command of the vehicle is switched to automatic trajectory control, the controller is configured to cause the vehicle, via the one or more actuation controls, to perform the one or more driving actions in accordance with the automatic trajectory command, and
      when command of the vehicle is switched to remote trajectory control, the controller is configured to cause the vehicle, via the one or more actuation controls, to perform the one or more driving actions in accordance with the remote trajectory command.

3. The system of claim 2, further comprising a processor configured to cause the switch to switch control of the vehicle between the automatic trajectory control and the remote station system control.

4. The system of claim 1, wherein the one or more trajectory plot points comprise trajectory plot points generated in 0.1 second intervals.

5. The system of claim 4, wherein the trajectory instructions comprise trajectory plot points generated over a 15 second period of time.

6. The system of claim 1, wherein:
   the one or more sensors comprise:
      a Light Detection and Ranging (LiDAR) sensor; and
      a camera, and
   the one or more data points comprise:
      a LiDAR point cloud generated by the LiDAR sensor; and
      an image captured by the camera.

7. The system of claim 1, wherein the one or more actuation controls comprise one or more of:
- a brake pedal;
- an acceleration pedal;
- a gear shift control; and
- a steering wheel.

8. A system for controlling a vehicle, comprising:
a vehicle;
one or more sensors, coupled to the vehicle, configured to generate one or more data points pertaining to one or more of:
   an environment of the vehicle; and
   one or more system component measurements of the vehicle;
one or more actuation controls configured to enable the vehicle to perform one or more driving actions;
a computing device, comprising a processor and a memory, coupled to the vehicle, configured to store programming instructions that, when executed by the processor, are configured to cause the processor to:
   receive one or more trajectory commands, wherein:
      each of the one or more trajectory commands comprises trajectory instructions which comprise one or more trajectory plot points,
      each trajectory plot point, of the one or more trajectory plot points, comprises position coordinates for the vehicle to be at a designated time, and
      the one or more trajectory commands comprise:
         a manual trajectory command;
         a remote trajectory command; and
         an automatic trajectory command;
   automatically generate the automatic trajectory command based on the one or more data points generated from the one or more sensors; and
   generate, based on the one or more trajectory plot points of the automatic trajectory command, one or more driving actions,
      wherein the one or more driving actions correlate to one or more actuator commands configured to cause the vehicle to be positioned in accordance with the one or more trajectory plot points of the automatic trajectory command; and
a remote station system comprising one or more remote actuation controls configured generate the one or more driving actions of the remote trajectory command, wherein the remote station system is configured to:
   receive the one or more data points generated by the one or more sensors;
   generate the remote trajectory command when adjustment of the one or more remote actuation controls is manually applied;
   generate, based on the one or more trajectory plot points of the remote trajectory command, one or more driving actions,
      wherein the one or more driving actions correlate to one or more actuator commands configured to cause the vehicle to be positioned in accordance with the one or more trajectory plot points; and
   transmit the remote trajectory command to the vehicle;
wherein:
   the one or more actuation controls are further configured to:
      generate the manual trajectory command when adjustment of the one or more actuation controls is manually applied; and
      generate, based on the one or more trajectory plot points of the manual trajectory command, one or more driving actions,
         wherein the one or more driving actions correlate to one or more actuator commands configured to cause the vehicle to be positioned in accordance with the one or more trajectory plot points of the manual trajectory command, and
   the programming instructions, when executed by the processor, are further configured to cause the processor to:
   determine whether the manual trajectory command is present; and
   when the manual trajectory command is present, cause the vehicle, via the one or more actuation controls, to perform the one or more driving actions in accordance with the manual trajectory command.

9. The system of claim 8, further comprising a switch configured to:
   when the manual trajectory command is not present, switch command of the vehicle between automatic trajectory control and remote station system control,
   wherein the programming instructions, when executed by the processor, are further configured to cause the processor to:
      when command of the vehicle is switched to automatic trajectory control, cause the vehicle, via the one or more actuation controls, to perform the one or more driving actions in accordance with the automatic trajectory command, and
      when command of the vehicle is switched to remote trajectory control, cause the vehicle, via the one or more actuation controls, to perform the one or more driving actions in accordance with the remote trajectory command.

10. The system of claim 9, wherein the programming instructions, when executed by the processor, are further configured to cause the processor to cause the switch to switch control of the vehicle between the automatic trajectory control and the remote station system control.

11. The system of claim 8, wherein the one or more trajectory plot points comprise trajectory plot points generated in 0.1 second intervals.

12. The system of claim 11, wherein the trajectory instructions comprise trajectory plot points generated over a 15 second period of time.

13. The system of claim 8, wherein:
the one or more sensors comprise:
   a Light Detection and Ranging (LiDAR) sensor; and
   a camera, and
the one or more data points comprise:
   a LiDAR point cloud generated by the LiDAR sensor; and
   an image captured by the camera.

14. The system of claim 8, wherein the one or more actuation controls comprise one or more of:
- a brake pedal;
- an acceleration pedal;
- a gear shift control; and
- a steering wheel.

15. A method for controlling a vehicle, comprising:
generating one or more data points from one or more sensors coupled to a vehicle, wherein the one or more data points pertain to one or more of:
   an environment of the vehicle; and
   one or more system component measurements of the vehicle;

via a controller, comprising a processor:
   receiving one or more trajectory commands, wherein:
      each of the one or more trajectory commands comprises trajectory instructions which comprise one or more trajectory plot points,
      each trajectory plot point, of the one or more trajectory plot points, comprises position coordinates for the vehicle to be at a designated time, and
      the one or more trajectory commands comprise:
         a manual trajectory command;
         a remote trajectory command; and
         an automatic trajectory command;
   automatically generating the automatic trajectory command based on the one or more data points generated from the one or more sensors; and
   generating, based on the one or more trajectory plot points of the automatic trajectory command, one or more driving actions,
      wherein the one or more driving actions correlate to one or more actuator commands configured to cause the vehicle to be positioned in accordance with the one or more trajectory plot points of the automatic trajectory command;
via a remote station system comprising one or more remote actuation controls configured generate the one or more driving actions of the remote trajectory command:
   receiving the one or more data points generated by the one or more sensors;
   generating the remote trajectory command when adjustment of the one or more remote actuation controls is manually applied;
   generating, based on the one or more trajectory plot points of the remote trajectory command, one or more driving actions,
      wherein the one or more driving actions correlate to one or more actuator commands configured to cause the vehicle to be positioned in accordance with the one or more trajectory plot points of the remote trajectory command; and
   transmitting the remote trajectory command to the vehicle;
via the one or more actuation controls:
   generating the manual trajectory command when adjustment of the one or more actuation controls is manually applied; and
   generating, based on the one or more trajectory plot points of the manual trajectory command, one or more driving actions,
      wherein the one or more driving actions correlate to one or more actuator commands configured to cause the vehicle to be positioned in accordance with the one or more trajectory plot points of the manual trajectory command, and
via the controller:
   determining whether the manual trajectory command is present; and
   when the manual trajectory command is present, causing the vehicle, via the one or more actuation controls, to perform the one or more driving actions in accordance with the manual trajectory command.

16. The method of claim 15, further comprising:
via a switch:
   when the manual trajectory command is not present, switching command of the vehicle between automatic trajectory control and remote station system control, wherein:
      when command of the vehicle is switched to automatic trajectory control, the controller is configured to cause the vehicle, via the one or more actuation controls, to perform the one or more driving actions in accordance with the automatic trajectory command, and
      when command of the vehicle is switched to remote trajectory control, the controller is configured to cause the vehicle, via the one or more actuation controls, to perform the one or more driving actions in accordance with the remote trajectory command.

17. The method of claim 15, wherein the one or more trajectory plot points comprise trajectory plot points generated in 0.1 second intervals.

18. The method of claim 17, wherein the trajectory instructions comprise trajectory plot points generated over a 15 second period of time.

19. The method of claim 15, wherein:
the one or more sensors comprise:
   a Light Detection and Ranging (LiDAR) sensor; and
   a camera, and
the one or more data points comprise:
   a LiDAR point cloud generated by the LiDAR sensor; and
   an image captured by the camera.

20. The method of claim 15, wherein the one or more actuation controls comprise one or more of:
a brake pedal;
an acceleration pedal;
a gear shift control; and
a steering wheel.

\* \* \* \* \*